(12) United States Patent
He

(10) Patent No.: US 12,119,753 B2
(45) Date of Patent: Oct. 15, 2024

(54) DC/DC CONVERTER AND METHOD FOR CONTROLLING OUTPUT VOLTAGE THEREOF

(71) Applicant: HUAWEI TECHNOLOGIES CO., LTD., Guangdong (CN)

(72) Inventor: Zhengyan He, Nuremberg (DE)

(73) Assignee: Huawei Technologies Co., Ltd., Shenzhen (CN)

( * ) Notice: Subject to any disclaimer, the term of this patent is extended or adjusted under 35 U.S.C. 154(b) by 192 days.

(21) Appl. No.: 17/964,113

(22) Filed: Oct. 12, 2022

(65) Prior Publication Data

US 2023/0113753 A1   Apr. 13, 2023

(30) Foreign Application Priority Data

Oct. 13, 2021 (CN) .......................... 202111192674.2

(51) Int. Cl.
*H02M 3/335* (2006.01)
*H02M 1/00* (2006.01)
*H02M 7/219* (2006.01)

(52) U.S. Cl.
CPC ..... *H02M 3/33576* (2013.01); *H02M 1/0006* (2021.05); *H02M 7/219* (2013.01); *H02M 3/33523* (2013.01); *H02M 3/33571* (2021.05); *H02M 3/33592* (2013.01)

(58) Field of Classification Search
CPC ......... H02M 3/33523; H02M 3/33571; H02M 3/33592
See application file for complete search history.

(56) References Cited

U.S. PATENT DOCUMENTS

| | | | | |
|---|---|---|---|---|
| 6,538,905 B2 * | 3/2003 | Greenfeld | ......... | H02M 3/33561 363/17 |
| 6,650,552 B2 * | 11/2003 | Takagi | .............. | H02M 3/33592 323/266 |
| 10,135,348 B2 * | 11/2018 | Hsiao | ................ | H02M 3/33546 |
| 2020/0287469 A1 * | 9/2020 | Cho | ................... | H02M 3/33538 |

* cited by examiner

*Primary Examiner* — Gary A Nash

(57) ABSTRACT

A DC/DC converter includes an inverter circuit, a transformer, a first rectifier circuit, a second rectifier circuit, and a voltage management circuit. The transformer includes a first primary-side winding, a first secondary-side winding, and a second secondary-side winding. Two terminals of the first primary-side winding are respectively connected to a first output terminal and a second output terminal of the inverter circuit, two terminals of the first secondary-side winding are connected to two input terminals of the first rectifier circuit, and two terminals of the second secondary-side winding are connected to two input terminals of the second rectifier circuit. The voltage management circuit controls an output terminal of the first rectifier circuit, an output terminal of the second rectifier circuit, and an output terminal of the DC/DC converter to be in a first connection relationship in a first sub-cycle of a first working cycle.

20 Claims, 6 Drawing Sheets

DC/DC CONVERTER AND METHOD FOR CONTROLLING OUTPUT VOLTAGE THEREOF

CROSS-REFERENCE TO RELATED APPLICATION

This application claims priority to Chinese Patent Application No. 202111192674.2, filed on Oct. 13, 2021, which is hereby incorporated by reference in its entirety.

TECHNICAL FIELD

This specification relates to the field of electronic circuit technologies, and in particular, to a DC/DC converter and a method for controlling an output voltage thereof.

BACKGROUND

An isolation DC/DC converter with −48 V input is widely used in the communication field, and used in design of a power supply of a communication device. Requirements for the DC/DC converter vary with different communication devices and application scenarios. A typical application is to convert a wide direct current input voltage range whose typical value is −48 V into a stable direct current voltage for output. There are a plurality of levels of output voltage, such as 5 V, 12 V, and 54 V.

Currently, the DC/DC converter shown in FIG. 1 is mainly used to perform direct current conversion on a wide range of direct current input voltages. As shown in FIG. 1, the DC/DC converter includes switching transistors Q1 to Q8, a primary-side inductive winding L1, a secondary-side inductive winding L2, an iron core T, and rectifier diodes D1 to D4. Q1 to Q4 with the inductor and capacitor shown form a common buck-boost circuit, Q5 to Q8 form a common open-loop LLC circuit, L1, L2, and T form a transformer (e.g., isolation inductor), and D1 to D4 form a rectifier circuit. Q5 and Q7 in the open-loop LLC circuit are separately connected to different input sources. A drain of Q5 is connected to a positive output terminal of the buck-boost circuit, and a drain of Q7 is connected to a positive output terminal of a direct current power supply. Based on a structure of the DC/DC converter, it can be learned that an output voltage of the DC/DC converter is $V_{out}=(V_b+V_{in})/(2N)$, where N is a ratio of a number of turns of the primary-side winding L1 to a number of turns of the secondary-side winding L2. Therefore, for different input voltages $V_{in}$, the DC/DC converter may stably output $V_{out}$ by adjusting an output voltage $V_b$ of the buck-boost circuit.

However, it can be learned from the foregoing formula for calculating $V_{out}$ that the DC/DC converter is only applicable to $V_{out} \geq V_{in}/(2N)$. When a required $V_{out}$ is low and $V_{in}$ is high, voltage stabilization cannot be implemented only by adjusting $V_b$. Therefore, the DC/DC converter has a small input voltage compatibility range and poor applicability.

SUMMARY

This specification provides a DC/DC converter and a method for controlling an output voltage thereof, to increase or decrease a voltage at an input terminal of the DC/DC converter by changing a connection relationship among an output terminal of a first rectifier circuit, an output terminal of a second rectifier circuit, and an output terminal of the DC/DC converter. This ensures that a voltage stably output by the DC/DC converter is a target output voltage regardless of the voltage at the input terminal of the DC/DC converter, expands an input voltage compatibility range of the DC/DC converter, and increases applicability.

According to a first aspect, this specification provides a DC/DC converter. The DC/DC converter includes an inverter circuit, a transformer, a first rectifier circuit, a second rectifier circuit, and a voltage management circuit. An input terminal of the inverter circuit is used as an input terminal of the DC/DC converter and connected to a direct current power supply. The transformer includes a first primary-side winding, a first secondary-side winding, and a second secondary-side winding. One terminal of the first primary-side winding is connected to a first output terminal of the inverter circuit, the other terminal of the first primary-side winding is connected to a second output terminal of the inverter circuit, two terminals of the first secondary-side winding are connected to two input terminals of the first rectifier circuit, and two terminals of the second secondary-side winding are connected to two input terminals of the second rectifier circuit. The voltage management circuit controls, in a first sub-cycle of a first working cycle, an output terminal of the first rectifier circuit, an output terminal of the second rectifier circuit, and an output terminal of the DC/DC converter to be in a first connection relationship, and controls, in a second sub-cycle of the first working cycle, the output terminal of the first rectifier circuit, the output terminal of the second rectifier circuit, and the output terminal of the DC/DC converter to be in a second connection relationship. Therefore, a voltage at the input terminal of the DC/DC converter may be increased or decreased by changing a connection relationship among the output terminal of the first rectifier circuit, the output terminal of the second rectifier circuit, and the output terminal of the DC/DC converter. This ensures that a voltage stably output by the DC/DC converter is a target output voltage regardless of the voltage at the input terminal of the DC/DC converter, expands an input voltage compatibility range of the DC/DC converter, and increases applicability.

With reference to the first aspect, in a first possible implementation, the DC/DC converter further includes a controller. The controller sends a first control signal and a second control signal to the voltage management circuit. The voltage management circuit controls, in the first sub-cycle based on the first control signal, the output terminal of the first rectifier circuit, the output terminal of the second rectifier circuit, and the output terminal of the DC/DC converter to be in the first connection relationship, and controls, in the second sub-cycle based on the second control signal, the output terminal of the first rectifier circuit, the output terminal of the second rectifier circuit, and the output terminal of the DC/DC converter to be in the second connection relationship. The controller herein may be disposed in the voltage management circuit, or may be disposed in the DC/DC converter and independent of the voltage management circuit. Therefore, flexibility is high.

With reference to the first aspect, in a second possible implementation, the first connection relationship and the second connection relationship are any two of the following connection relationships:

- the output terminal of the first rectifier circuit and a branch in which the output terminal of the second rectifier circuit is disposed are connected in series and then connected to the output terminal of the DC/DC converter;
- the branch in which the output terminal of the second rectifier circuit is disposed is connected to the output terminal of the DC/DC converter;

the output terminal of the first rectifier circuit is connected to the output terminal of the DC/DC converter, and a first terminal of the branch in which the output terminal of the second rectifier circuit is disposed is connected to a first output terminal of the DC/DC converter; and the branch in which the output terminal of the second rectifier circuit is disposed and the output terminal of the first rectifier circuit are connected in parallel to the output terminal of the DC/DC converter. It may be understood that, after the DC/DC converter works, different voltages may be stably output in any combination of at least two of the four connection relationships in the first working cycle. Therefore, flexibility and applicability are high.

With reference to the first aspect, in a third possible implementation, the voltage management circuit is configured to: when a voltage at the input terminal of the DC/DC converter is less than a preset voltage, control the output terminal of the first rectifier circuit, the output terminal of the second rectifier circuit, and the output terminal of the DC/DC converter to be in the first connection relationship in the first sub-cycle and to be in the second connection relationship in the second sub-cycle. The first connection relationship is that the output terminal of the first rectifier circuit is connected in series to the branch in which the first output terminal of the second rectifier circuit is disposed, and then connected to the output terminal of the DC/DC converter. The second connection relationship is that the branch in which the output terminal of the second rectifier circuit is disposed is connected to the output terminal of the DC/DC converter. It may be understood that, when the voltage at the input terminal of the DC/DC converter is less than the preset voltage, the DC/DC converter may stably output the target output voltage in the foregoing manner. Therefore, applicability is high.

With reference to the first aspect, in a fourth possible implementation, when the voltage at the input terminal of the DC/DC converter is less than the preset voltage, a voltage at the output terminal of the DC/DC converter is $V_{out}=V_1*D_1+V_2$, where $V_1$ is an output voltage of the first rectifier circuit, $V_2$ is an output voltage of the second rectifier circuit, and $D_1$ is a ratio of the first sub-cycle to the first working cycle. Therefore, the DC/DC converter may stably output, by adjusting $D_1$, the target output voltage that needs to be output. Therefore, an operation is simple and applicability is high.

With reference to the first aspect, in a fifth possible implementation, when the voltage at the input terminal of the DC/DC converter is greater than or equal to the preset voltage, the voltage management circuit controls the output terminal of the first rectifier circuit, the output terminal of the second rectifier circuit, and the output terminal of the DC/DC converter to be in the first connection relationship in the first sub-cycle and to be in the second connection relationship in the second sub-cycle. The first connection relationship is that the output terminal of the first rectifier circuit is connected to the output terminal of the DC/DC converter, and the first terminal of the branch in which the output terminal of the second rectifier circuit is disposed is connected to the first output terminal of the DC/DC converter. The second connection relationship is that the branch in which the output terminal of the second rectifier circuit is disposed and the output terminal of the first rectifier circuit are connected in parallel to the output terminal of the DC/DC converter. It may be understood that, when the voltage at the input terminal of the DC/DC converter is greater than or equal to the preset voltage, the DC/DC converter may stably output the target output voltage in the foregoing manner. Therefore, applicability is high.

With reference to the first aspect, in a sixth possible implementation, when the voltage at the input terminal of the DC/DC converter is greater than or equal to the preset voltage, a voltage at the output terminal of the DC/DC converter is $V_{out}=V_2/(1-D_1)$, where $V_2$ is an output voltage of the second rectifier circuit, and $D_1$ is the ratio of the first sub-cycle to the first working cycle. Therefore, the DC/DC converter may stably output, by adjusting $D_1$, the target output voltage that needs to be output. Therefore, an operation is simple and applicability is high.

With reference to the first aspect, in a seventh possible implementation, the voltage management circuit includes a first inductor, a first switching transistor, a second switching transistor, and a third switching transistor. A first terminal of the third switching transistor is connected to a first output terminal of the first rectifier circuit and a second output terminal of the DC/DC converter, a second terminal of the third switching transistor is connected to a first output terminal of the second rectifier circuit by using the first inductor, the second terminal of the third switching transistor is connected to a first terminal of the second switching transistor, a second terminal of the second switching transistor is connected to a second output terminal of the first rectifier circuit and a first terminal of the first switching transistor, and a second terminal of the first switching transistor is connected to a second output terminal of the second rectifier circuit and the first output terminal of the DC/DC converter. Compared with a common buck-boost circuit with four switching transistors in a partial power transmission topology, the voltage management circuit requires fewer switching transistors. In addition, not only an input voltage may be normally increased and decreased, but also the connection relationship among the output terminal of the first rectifier circuit, the output terminal of the second rectifier circuit, and the output terminal of the DC/DC converter may be changed. The circuit has low costs and strong functions.

With reference to the first aspect, in an eighth possible implementation, when the DC/DC converter includes the first primary-side winding, the output voltage of the first rectifier circuit is $V_1=V_{in}/N11$, and the output voltage of the second rectifier circuit $V_2=V_{in}/N12$, where $V_{in}$ is the voltage at the input terminal of the DC/DC converter, N11 is a ratio of a number of turns of the first primary-side winding to a number of turns of the first secondary-side winding, and N12 is a ratio of the number of turns of the first primary-side winding to a number of turns of the second secondary-side winding.

With reference to the first aspect, in a ninth possible implementation, the transformer further includes a second primary-side winding. One terminal of the second primary-side winding is connected to the second output terminal of the inverter circuit, and the other terminal of the second primary-side winding is connected to a third output terminal of the inverter circuit. Therefore, the input voltage compatibility range of the DC/DC converter may be further expanded by controlling a connection relationship between the first primary-side winding and the second primary-side winding. Applicability is higher.

With reference to the first aspect, in a tenth possible implementation, the inverter circuit is configured to control the first primary-side winding and the second primary-side winding to be connected in parallel to two terminals of the direct current power supply, or control the first primary-side winding and the second primary-side winding to be connected in series and then connected to the two terminals of the direct current power supply. Therefore, the voltage at the input terminal of the DC/DC converter may be increased or decreased by serially or parallelly connecting the first primary-side winding to the second primary-side winding. The input voltage compatibility range of the DC/DC converter is further expanded, and applicability is higher.

With reference to the first aspect, in an eleventh possible implementation, when the DC/DC converter includes a controller, the controller sends a third control signal to the inverter circuit, and controls the inverter circuit to enable, based on the received third control signal, the first primary-side winding and the second primary-side winding to be connected in parallel to the two terminals of the direct current power supply. Alternatively, the controller controls the inverter circuit to enable the first primary-side winding and the second primary-side winding to be connected in series and then connected to the two terminals of the direct current power supply.

With reference to the first aspect, in a twelfth possible implementation, when the voltage at the input terminal of the DC/DC converter is less than the preset voltage, the controller sends the third control signal to the inverter circuit, where the third control signal is used to control the inverter circuit to enable the first primary-side winding and the second primary-side winding to be connected in parallel to the two terminals of the direct current power supply.

With reference to the first aspect, in a thirteenth possible implementation, when the first primary-side winding and the second primary-side winding are connected in parallel to the direct current power supply, the output voltage of the first rectifier circuit is $V_1 = V_{in}/N1$, and the output voltage of the second rectifier circuit is $V_2 = V_{in}/N2$, where $V_{in}$ is the voltage at the input terminal of the DC/DC converter, N1 is a ratio of a number of turns of the first primary-side winding to a number of turns of the first secondary-side winding, and N2 is a ratio of a number of turns of the second primary-side winding to a number of turns of the second secondary-side winding. When the DC/DC converter is designed, different requirements for an actual output voltage may be met by changing the number of turns of each winding in the first primary-side winding, the first secondary-side winding, the second primary-side winding, and the second secondary-side winding. Applicability is high.

With reference to the first aspect, in a fourteenth possible implementation, when the voltage at the input terminal of the DC/DC converter is greater than or equal to the preset voltage, the controller sends the third control signal to the inverter circuit, where the third control signal is used to control the inverter circuit to enable the first primary-side winding and the second primary-side winding to be connected in series and then connected to the two terminals of the direct current power supply.

With reference to the first aspect, in a fifteenth possible implementation, when the first primary-side winding and the second primary-side winding are connected in series and then connected to the direct current power supply, the output voltage of the first rectifier circuit is $V_1 = V_{in1}/N1$, and the output voltage of the second rectifier circuit is $V_2 = V_{in2}/N2$, where $V_{in1}$ and $V_{in2}$ are determined based on the voltage at the input terminal of the DC/DC converter, N1 is a ratio of a number of turns of the first primary-side winding to a number of turns of the first secondary-side winding, and N2 is a ratio of a number of turns of the second primary-side winding to a number of turns of the second secondary-side winding. When the DC/DC converter is designed, the different requirements for an actual output voltage may be met by changing a number of turns of each winding of the first primary-side winding, the first secondary-side winding, the second primary-side winding, and the second secondary-side winding. Applicability is high.

With reference to the first aspect, in a sixteenth possible implementation, the DC/DC converter further includes a first resonant circuit and a second resonant circuit, the first output terminal of the inverter circuit is connected to the one terminal of the first primary-side winding by using the first resonant circuit, the third output terminal of the inverter circuit is connected to the other terminal of the second primary-side winding by using the second resonant circuit, and a resonance parameter of the first resonant circuit is the same as that of the second resonant circuit. Therefore, when a switching transistor in the DC/DC converter switched between conduction and cut off at a zero voltage or a zero current, a loss at the switching transistor may be reduced. Applicability is high.

According to a second aspect, this specification provides a method for controlling an output voltage of a DC/DC converter. The DC/DC converter includes an inverter circuit, a transformer, a first rectifier circuit, and a second rectifier circuit. An input terminal of the inverter circuit is used as an input terminal of the DC/DC converter and connected to a direct current power supply. The transformer includes a first primary-side winding, a first secondary-side winding, and a second secondary-side winding. One terminal of the first primary-side winding is connected to a first output terminal of the inverter circuit, the other terminal of the first primary-side winding is connected to a second output terminal of the inverter circuit, two terminals of the first secondary-side winding are connected to two input terminals of the first rectifier circuit, and two terminals of the second secondary-side winding are connected to two input terminals of the second rectifier circuit. The method includes: controlling, in a first sub-cycle of a first working cycle, an output terminal of the first rectifier circuit, an output terminal of the second rectifier circuit, and an output terminal of the DC/DC converter to be in a first connection relationship, and controlling, in a second sub-cycle of the first working cycle, the output terminal of the first rectifier circuit, the output terminal of the second rectifier circuit, and the output terminal of the DC/DC converter to be in a second connection relationship.

With reference to the second aspect, in a first possible implementation, the method includes: controlling, in the first sub-cycle based on a first control signal, the output terminal of the first rectifier circuit, the output terminal of the second rectifier circuit, and the output terminal of the DC/DC converter to be in the first connection relationship; and controlling, in the second sub-cycle based on a second control signal, the output terminal of the first rectifier circuit, the output terminal of the second rectifier circuit, and the output terminal of the DC/DC converter to be in the second connection relationship.

With reference to the second aspect, in a second possible implementation, the first connection relationship and the second connection relationship are any two of the following connection relationships:

the output terminal of the first rectifier circuit and a branch in which the output terminal of the second rectifier circuit is disposed are connected in series and then connected to the output terminal of the DC/DC converter;

the branch in which the output terminal of the second rectifier circuit is disposed is connected to the output terminal of the DC/DC converter;

the output terminal of the first rectifier circuit is connected to the output terminal of the DC/DC converter, and a first terminal of the branch in which the output terminal of the second rectifier circuit is disposed is connected to a first output terminal of the DC/DC converter; and the branch in which the output terminal of the second rectifier circuit is disposed and the output terminal of the first rectifier circuit are connected in parallel to the output terminal of the DC/DC converter.

With reference to the second aspect, in a third possible implementation, the method includes: when a voltage at the input terminal of the DC/DC converter is less than a preset voltage, controlling the output terminal of the first rectifier circuit, the output terminal of the second rectifier circuit, and the output terminal of the DC/DC converter to be in the first connection relationship in the first sub-cycle and to be in the second connection relationship in the second sub-cycle. The first connection relationship is that the output terminal of the first rectifier circuit is connected in series to the branch in which the output terminal of the second rectifier circuit is disposed, and then connected to the output terminal of the DC/DC converter; and the second connection relationship is that the branch in which the output terminal of the second rectifier circuit is disposed is connected to the output terminal of the DC/DC converter.

With reference to the second aspect, in a fourth possible implementation, a voltage at the output terminal of the DC/DC converter is $V_{out}=V_1*D_1+V_2$, where $V_1$ is an output voltage of the first rectifier circuit, $V_2$ is an output voltage of the second rectifier circuit, and $D_1$ is a ratio of the first sub-cycle to the first working cycle.

With reference to the second aspect, in a fifth possible implementation, the method includes: when the voltage at the input terminal of the DC/DC converter is greater than or equal to the preset voltage, controlling the output terminal of the first rectifier circuit, the output terminal of the second rectifier circuit, and the output terminal of the DC/DC converter to be in the first connection relationship in the first sub-cycle and to be in the second connection relationship in the second sub-cycle. The first connection relationship is that the output terminal of the first rectifier circuit is connected to the output terminal of the DC/DC converter, and the first terminal of the branch in which the output terminal of the second rectifier circuit is disposed is connected to the first output terminal of the DC/DC converter. The second connection relationship is that the branch in which the output terminal of the second rectifier circuit is disposed and the output terminal of the first rectifier circuit are connected in parallel to the output terminal of the DC/DC converter.

With reference to the second aspect, in a sixth possible implementation, a voltage at the output terminal of the DC/DC converter is $V_{out}=V_2/(1-D_1)$, where $V_2$ is an output voltage of the second rectifier circuit, and $D_1$ is the ratio of the first sub-cycle to the first working cycle.

With reference to the second aspect, in a seventh possible implementation, when the transformer includes the first primary-side winding, the output voltage of the first rectifier circuit is $V_1=V_{in}/N11$, and the output voltage of the second rectifier circuit $V_2=V_{in}/N12$, where $V_{in}$ is the voltage at the input terminal of the DC/DC converter, N11 is a ratio of a number of turns of the first primary-side winding to a number of turns of the first secondary-side winding, and N12 is a ratio of the number of turns of the first primary-side winding to a number of turns of the second secondary-side winding.

With reference to the second aspect, in an eighth possible implementation, the transformer further includes a second primary-side winding. One terminal of the second primary-side winding is connected to the second output terminal of the inverter circuit, and the other terminal of the second primary-side winding is connected to a third output terminal of the inverter circuit.

With reference to the second aspect, in a ninth possible implementation, the method includes: controlling the inverter circuit to enable the first primary-side winding and the second primary-side winding to be connected in parallel to two terminals of the direct current power supply, or controlling the inverter circuit to enable the first primary-side winding and the second primary-side winding to be connected in series and then connected to the two terminals of the direct current power supply.

With reference to the second aspect, in a tenth possible implementation, when the voltage at the input terminal of the DC/DC converter is less than the preset voltage, the controller controls the inverter circuit to enable the first primary-side winding and the second primary-side winding to be connected in parallel to the two terminals of the direct current power supply.

With reference to the second aspect, in an eleventh possible implementation, when the first primary-side winding and the second primary-side winding are connected in parallel to the two terminals of the direct current power supply, the output voltage of the first rectifier circuit is $V_1=V_{in}/N1$, and the output voltage of the second rectifier circuit is $V_2=V_{in}/N2$, where $V_{in}$ is the voltage at the input terminal of the DC/DC converter, N1 is a ratio of a number of turns of the first primary-side winding to a number of turns of the first secondary-side winding, and N2 is a ratio of a number of turns of the second primary-side winding to a number of turns of the second secondary-side winding.

With reference to the second aspect, in a twelfth possible implementation, the method includes: when the voltage at the input terminal of the DC/DC converter is greater than or equal to the preset voltage, controlling the inverter circuit to enable the first primary-side winding and the second primary-side winding to be connected in series and then connected to the two terminals of the direct current power supply.

With reference to the second aspect, in a thirteenth possible implementation, when the first primary-side winding and the second primary-side winding are connected in series and then connected to the two terminals of the direct current power supply, the output voltage of the first rectifier circuit is $V_1=V_{in1}/N1$, and the output voltage of the second rectifier circuit is $V_2=V_{in2}/N2$, where $V_{in1}$ and $V_{in2}$ are determined based on the voltage at the input terminal of the DC/DC converter, N1 is a ratio of a number of turns of the first primary-side winding to a number of turns of the first secondary-side winding, and N2 is a ratio of a number of turns of the second primary-side winding to a number of turns of the second secondary-side winding.

With reference to the second aspect, in a fourteenth possible implementation, the DC/DC converter further includes a first resonant circuit and a second resonant circuit, the first output terminal of the inverter circuit is connected to the one terminal of the first primary-side winding by using the first resonant circuit, the third output terminal of the inverter circuit is connected to the other terminal of the second primary-side winding by using the second resonant circuit, and a resonance parameter of the first resonant circuit is the same as that of the second resonant circuit.

It should be understood that implementations and beneficial effects of the foregoing aspects of this specification may be referred to each other.

DESCRIPTION OF EMBODIMENTS

A DC/DC converter provided in this specification is applicable to different application scenarios, for example, a power supply scenario of an electronic device (the electronic device may be a smartphone, a tablet computer, a desktop computer, a smart speaker, and the like), a new energy power supply scenario (for example, a photovoltaic power supply scenario and a wind power supply scenario), and the like. The following uses the power supply scenario of the electronic device as an example, and details are not described below again.

Figure 1:
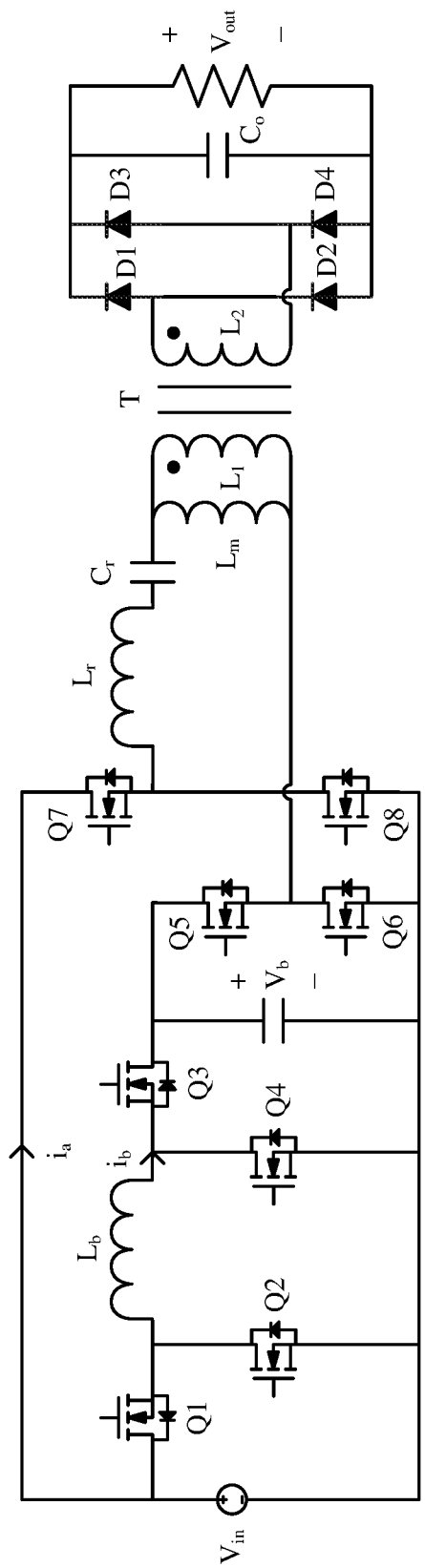
FIG. 1 is a schematic diagram of a structure of a DC/DC converter according to the conventional technology.
Figure 2:
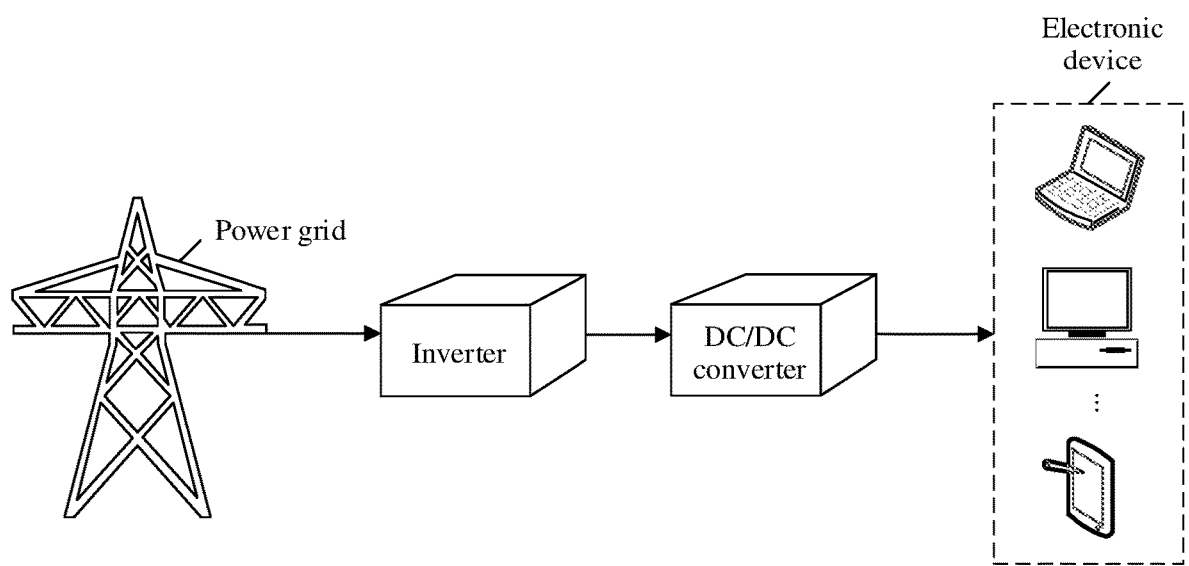
FIG. 2 is a schematic diagram of an application scenario of a DC/DC converter according to this specification.

Refer to FIG. 2. FIG. 2 is a schematic diagram of an application scenario of a DC/DC converter according to this specification. In the power supply scenario of the electronic device, as shown in FIG. 2, an input terminal of the DC/DC converter is connected to an output terminal of an inverter, and an output terminal of the DC/DC converter is connected to the electronic device. When power needs to be supplied to the electronic device, the inverter may first invert an alternating current voltage (for example, 220 V) provided by a power grid into a first direct current voltage, and output the first direct current voltage to the input terminal of the DC/DC converter. The DC/DC converter performs direct current conversion on the first direct current voltage at the input terminal to obtain a second direct current voltage, and outputs the second direct current voltage to the electronic device, to supply power to the electronic device. The DC/DC converter provided in this specification may change a connection relationship among an output terminal of a first rectifier circuit, an output terminal of a second rectifier circuit, and an output terminal of the DC/DC converter, to increase or decrease a voltage at the input terminal of the DC/DC converter and expand an input voltage compatibility range of the DC/DC converter, and increase applicability.

The foregoing is merely an example of the application scenario of the DC/DC converter provided in this specification, and is not exhaustive. The application scenario is not limited in this specification.

Figure 3:
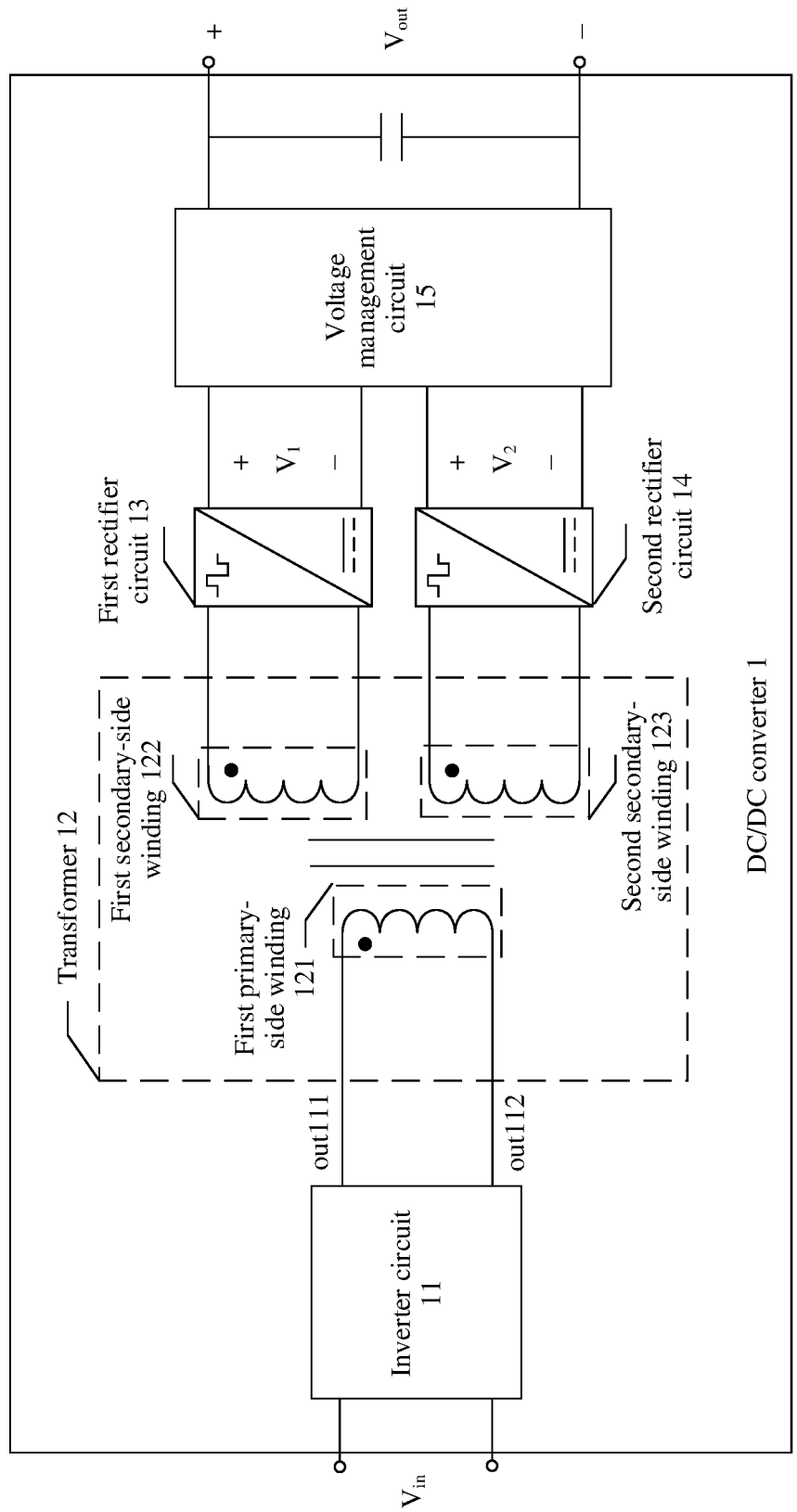
FIG. 3 is a schematic diagram of a structure of a DC/DC converter according to this specification.
Figure 4:
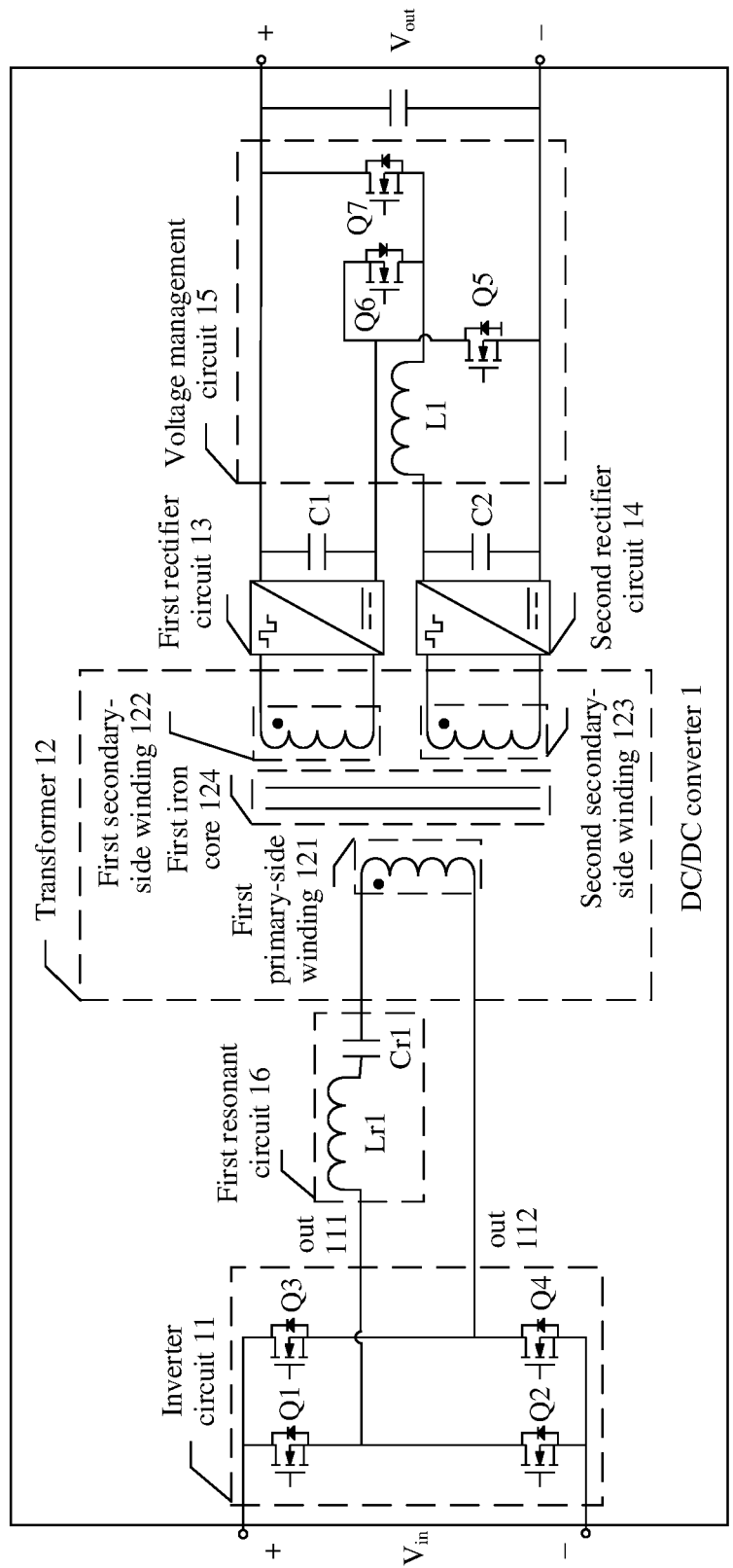
FIG. 4 is a schematic diagram of another structure of a DC/DC converter according to this specification.
Figure 5:
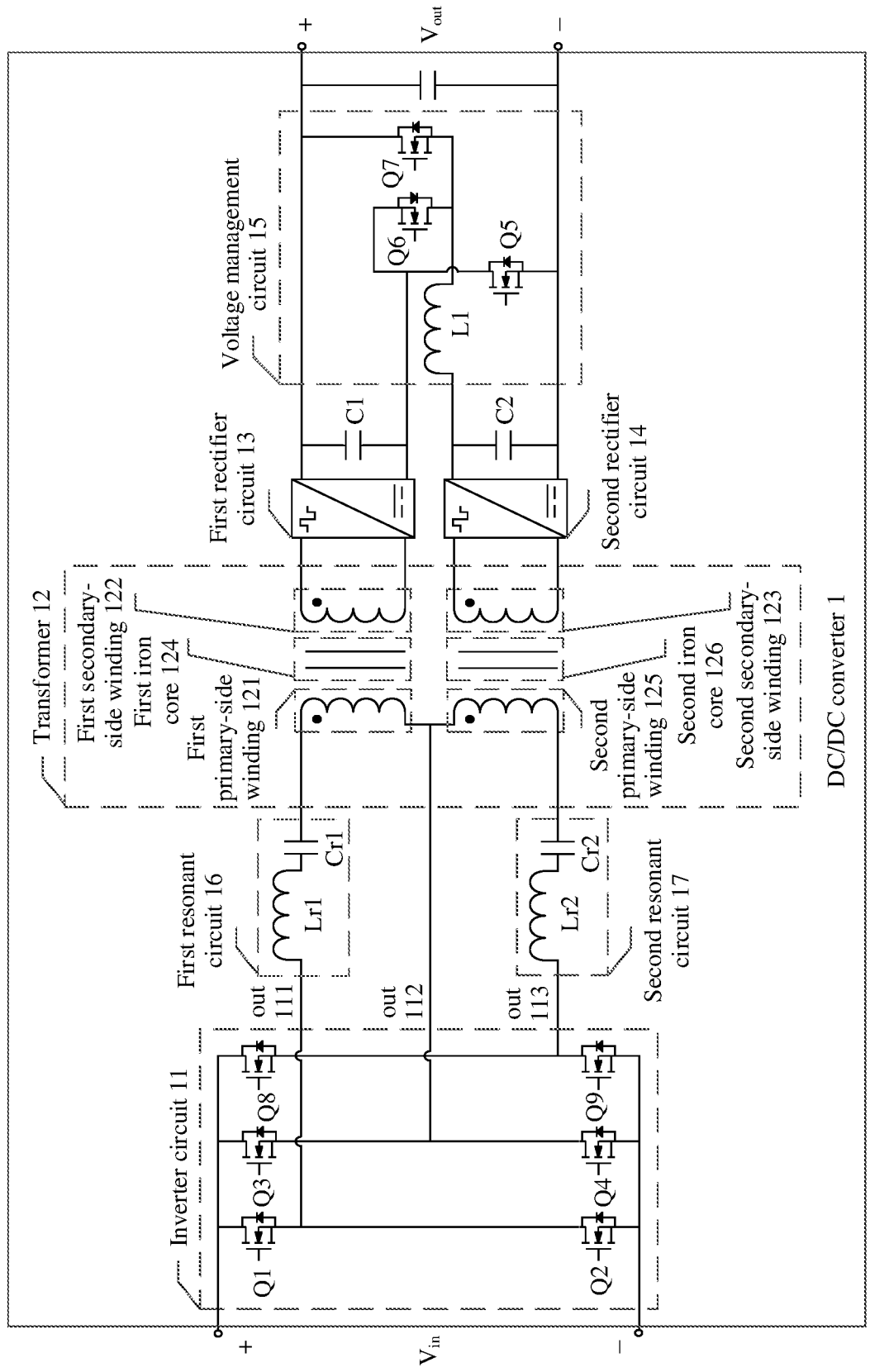
FIG. 5 is a schematic diagram of still another structure of a DC/DC converter according to this specification.

The following describes, as examples, a working principle of the DC/DC converter provided in this specification with reference to FIG. 3 to FIG. 5.

Refer to FIG. 3. FIG. 3 is a schematic diagram of a structure of a DC/DC converter according to this specification. As shown in FIG. 3, a DC/DC converter 1 includes an inverter circuit 11, a transformer 12, a first rectifier circuit 13, a second rectifier circuit 14, and a voltage management circuit 15. An input terminal of the inverter circuit 11 is used as an input terminal of the DC/DC converter 1 and connected to a direct current power supply. The transformer 12 includes a first primary-side winding 121, a first secondary-side winding 122, and a second secondary-side winding 123. A dotted terminal (that is, a winding terminal marked with a mark point in the first primary-side winding 121) of the first primary-side winding 121 is connected to a first output terminal out 111 of the inverter circuit 11, and an undotted terminal (that is, a winding terminal not marked with a mark point in the first primary-side winding 121) of the first primary-side winding 121 is connected to a second output terminal out 112 of the inverter circuit 11. Two terminals of the first secondary-side winding 122 are connected to two input terminals of the first rectifier circuit 13, and two terminals of the second secondary-side winding 123 are connected to two input terminals of the second rectifier circuit 14. The voltage management circuit 15 is connected to an output terminal of the first rectifier circuit 13, an output terminal of the second rectifier circuit 14, and an output terminal of the DC/DC converter 1.

In an optional implementation, the voltage management circuit 15 controls, in a first sub-cycle of a first working cycle, the output terminal of the first rectifier circuit 13, the output terminal of the second rectifier circuit 14, and the output terminal of the DC/DC converter 1 to be in a first connection relationship, and controls, in a second sub-cycle of the first working cycle, the output terminal of the first rectifier circuit 13, the output terminal of the second rectifier circuit 14, and the output terminal of the DC/DC converter 1 to be in a second connection relationship.

Specifically, when a controller is disposed outside the voltage management circuit 15, the controller sends a first control signal and a second control signal to the voltage management circuit 15. The voltage management circuit 15 controls, in the first sub-cycle based on the received first control signal, the output terminal of the first rectifier circuit 13, the output terminal of the second rectifier circuit 14, and the output terminal of the DC/DC converter 1 to be in the first connection relationship, and controls, in the second sub-cycle based on the received second control signal, the output terminal of the first rectifier circuit 13, the output terminal of the second rectifier circuit 14, and the output terminal of the DC/DC converter 1 to be in the second connection relationship. It should be noted that, when the controller is disposed outside the voltage management circuit 15, the controller may be a controller disposed inside the DC/DC converter 1, or may be a controller in another device other than the DC/DC converter 1. This is not limited in this specification.

Optionally, when the controller is disposed inside the voltage management circuit 15, the voltage management circuit 15 controls, in the first sub-cycle of the first working cycle, the output terminal of the first rectifier circuit 13, the output terminal of the second rectifier circuit 14, and the output terminal of the DC/DC converter 1 to be in the first connection relationship, and controls, in the second sub-cycle of the first working cycle, the output terminal of the first rectifier circuit 13, the output terminal of the second rectifier circuit 14, and the output terminal of the DC/DC converter 1 to be in the second connection relationship.

It may be understood that, the voltage management circuit 15 may control, in the first working cycle, the output terminal of the first rectifier circuit 13, the output terminal of the second rectifier circuit 14, and the output terminal of the DC/DC converter 1 to be in the first connection relationship and to be in the second connection relationship. Therefore, a voltage $V_{in}$ at the input terminal of the DC/DC converter 1 may be increased or decreased by changing a connection relationship among the output terminal of the first rectifier circuit 13, an output terminal of the second rectifier circuit 14, and the output terminal of the DC/DC converter 1. This ensures that a voltage stably output by the DC/DC converter 1 is a target output voltage regardless of $V_{in}$, expands an input voltage compatibility range of the DC/DC converter 1, and increases applicability.

For example, refer to FIG. 4. FIG. 4 is a schematic diagram of another structure of a DC/DC converter according to this specification. As shown in FIG. 4, the inverter circuit 11 includes switching transistors Q1 to Q4. The switching transistors are metal-oxide semiconductor field-effect transistors MOSFETs. Q1 and Q2 are connected in series to form a first phase bridge. Q3 and Q4 are connected in series to form a second phase bridge. A first terminal (that is, a drain of Q1) of the first phase bridge and a first terminal (that is, a drain of Q3) of the second phase bridge are connected to form a positive input terminal of the inverter circuit 11, that is, a positive input terminal of the DC/DC converter 1. A second terminal (that is, a source of Q2) of the first phase bridge and a second terminal (that is, a source of Q4) of the second phase bridge are connected to form a negative input terminal of the inverter circuit 11, that is, a negative input terminal of the DC/DC converter 1. A connection point between Q1 and Q2 forms the first output terminal out 111 of the inverter circuit 11, and a connection point between Q3 and Q4 forms the second output terminal out 112 of the inverter circuit 11. The transformer 12 further includes a first iron core 124. The first primary-side winding 121, the first secondary-side winding 122, and the second secondary-side winding 123 are coupled to the first iron core 124. The voltage management circuit 15 includes a first inductor L1, a first switching transistor Q5, a second switching transistor Q6, and a third switching transistor Q7. A first terminal (that is, a drain of Q7) of Q7 is connected to a first output terminal (that is, a positive output terminal of the first rectifier circuit 13) of the first rectifier circuit 13 and a second output terminal (that is, a positive output terminal of the DC/DC converter 1) of the DC/DC converter 1. A second terminal of Q7 (that is, a source of Q7) is connected to a first output terminal (that is, a positive output terminal of the second rectifier circuit 14) of the second rectifier circuit 14 through L1, and the second terminal of Q7 is connected to a first terminal of Q6 (that is, a drain of Q6), a second terminal (that is, a source of Q6) of Q6 is connected to a second output terminal (that is, a negative output terminal of the first rectifier circuit 13) of the first rectifier circuit 13 and a first terminal (that is, a drain of Q5) of Q5, and a second terminal (that is, a source of Q5) of Q5. A second output terminal (that is, a negative output terminal of the second rectifier circuit 14) of the second rectifier circuit 14 is connected to a first output terminal (a negative output terminal of the DC/DC converter 1) of the DC/DC converter 1.

Optionally, the DC/DC converter 1 further includes a first resonant circuit 16. The first resonant circuit 16 includes an inductor Lr1 and a capacitor Cr1. The first output terminal out 111 of the inverter circuit 11 is connected to the dotted terminal of the first primary-side winding 121 by using Lr1 and Cr1 in sequence. The first resonant circuit 16 is configured to convert a sinusoidal alternating current output by the inverter circuit 11 into a zero-crossing sinusoidal alternating current. When a switching transistor in the DC/DC converter 1 switches between conduction and is cut off at zero voltage or zero current, a loss of the switching transistor may be reduced by using the first resonant circuit 16. Zero-voltage switching, that is, switching is performed when a voltage at two terminals of the switching transistor in the DC/DC converter is 0, can avoid loss otherwise introduced by the switching transistor. Zero-current switching, that is, switching is performed when a current flowing through the switching transistor in the DC/DC converter is 0, can avoid the switching transistor introducing loss.

Optionally, the DC/DC converter 1 further includes capacitors C1 and C2. Two terminals of C1 are connected to two output terminals of the first rectifier circuit 13, and configured to filter and stabilize a direct current voltage output by the first rectifier circuit 13. Two terminals of C2 are connected to two output terminals of the second rectifier circuit 14, and configured to filter and stabilize a direct current voltage output by the second rectifier circuit 14. The switching transistors in FIG. 4 may also be IGBTs, triodes, or the like.

The following uses an example in which the controller is disposed inside the voltage management circuit 15.

In an optional implementation, after the DC/DC converter 1 starts to work, the controller in the voltage management circuit 15 controls working statuses of Q5 to Q7, to enable the output terminal of the first rectifier circuit 13, the output terminal of the second rectifier circuit 14, and the output terminal of the DC/DC converter 1 to be in the first connection relationship in the first sub-cycle of the first working cycle and to be in the second connection relationship in the second sub-cycle of the first working cycle.

The first connection relationship and the second connection relationship may be any two of the following connection relationships:

the output terminal of the first rectifier circuit 13 and a branch in which the output terminal of the second rectifier circuit 14 is disposed are connected in series and then connected to the output terminal of the DC/DC converter 1;

the branch in which the output terminal of the second rectifier circuit 14 is disposed is connected to the output terminal of the DC/DC converter 1;

the output terminal of the first rectifier circuit 13 is connected to the output terminal of the DC/DC converter 1, and a first terminal of the branch in which the output terminal of the second rectifier circuit 14 is disposed is connected to a first output terminal of the DC/DC converter 1; and the branch in which the output terminal of the second rectifier circuit 14 is disposed and the output terminal of the first rectifier circuit 13 are connected in parallel to the output terminal of the DC/DC converter 1.

Specifically, after the DC/DC converter 1 starts to work, the controller in the voltage management circuit 15 controls, by sending a PWM wave to Q1 to Q4, Q1 and Q4 to conduct in a third sub-cycle of a second working cycle, and controls Q2 and Q3 to conduct in a fourth sub-cycle of the second working cycle. Both the third sub-cycle and the fourth sub-cycle are half of the second working cycle. Therefore, a direct current at the input terminal of the DC/DC converter 1 may be converted into a sinusoidal alternating current by using the inverter circuit 11. Further, the first resonant circuit 16 may convert the sinusoidal alternating current output by the inverter circuit 11 into the zero-crossing sinusoidal alternating current. The transformer 12 performs voltage conversion on the alternating current output by the first resonant circuit 16, and outputs the converted alternating current to the output terminal of the first rectifier circuit 13 and the output terminal of the second rectifier circuit 14. The first rectifier circuit 13 rectifies an alternating current output by the first secondary-side winding 122 to obtain an output voltage of the first rectifier circuit 13, that is, a direct current voltage $V_1 = V_{in}/N11$. The second rectifier circuit 14 rectifies an alternating current output by the second secondary-side winding 123 to obtain an output voltage of the second rectifier circuit 14, that is, a direct current voltage $V_2=V_{in}/N12$, where $V_{in}$ is a voltage at the input terminal of the DC/DC converter 1, N11 is a ratio of a number of turns of the first primary-side winding 121 to a number of turns of the first secondary-side winding 122, and N12 is a ratio of the number of turns of the first primary-side winding 121 to a number of turns of the second secondary-side winding 123. The second working cycle herein may be the same as or different from the first working cycle. This is not limited in this specification.

In addition, after the DC/DC converter 1 starts to work, the controller in the voltage management circuit 15 obtains the voltage $V_{in}$ at the input terminal of the DC/DC converter 1, and controls, based on $V_{in}$, the connection relationship among the output terminal of the first rectifier circuit 13, the output terminal of the second rectifier circuit 14, and the output terminal of the DC/DC converter 1.

In an optional embodiment, when the voltage $V_{in}$ at the input terminal of the DC/DC converter 1 is less than a preset voltage, the controller controls Q5 to be cut off and controls Q6 to conduct in the first sub-cycle, where the preset voltage is a product of the target output voltage and N11. Because Q6 and Q7 complementarily conduct, and Q7 is cut off when Q6 is conducts, in the first sub-cycle, a current flows from the positive output terminal of the second rectifier circuit 14 to the positive output terminal of the DC/DC converter 1 through L1, Q6, and C1 in sequence. In the first sub-cycle, the output terminal of the first rectifier circuit 13 and the branch in which the output terminal of the second rectifier circuit 14 is disposed (that is, a branch formed by serially connecting the output terminal of the second rectifier circuit 14 to L1) are connected in series and then connected to two output terminals of the DC/DC converter 1; at the same time, a current variation on L1 in the first sub-cycle is $\Delta I_1=(V_1+V_2-V_{out})*D_1*T/L$, where L is inductance of L1, and $D_1$ is a ratio of the first sub-cycle to the first working cycle T, that is, a duty cycle when Q6 conducts. In addition, when Q5 is cut off, and Q7 conducts in the second sub-cycle, because Q6 and Q7 complementarily conduct, and Q6 is cut off when Q7 conducts, in the second sub-cycle, the current flows from the positive output terminal of the second rectifier circuit 14 to the positive output terminal of the DC/DC converter 1 through L1 and Q7. In the second sub-cycle, the branch in which the output terminal of the second rectifier circuit 14 is disposed (that is, the branch formed by serially connecting the output terminal of the second rectifier circuit 14 to L1) is connected to two output terminals of the DC/DC converter 1. At the same time, the current variation on L1 in the second sub-cycle is $\Delta I_2=(V_{out}-V_2)*(1-D_1)*T/L$. A sum of the first sub-cycle and the second sub-cycle may be the first working cycle, or may be a portion of the first working cycle.

When the inductor is stable, a current variation in a process of storing energy in the inductor is equal to a current variation in a process of releasing the energy from the inductor. Therefore, when the sum of the first sub-cycle and the second sub-cycle is the first working cycle, $\Delta I_1=\Delta I_2$ can be obtained. In this case, a voltage at the output terminal of the DC/DC converter 1 is $V_{out}=V_1*D_1+V_2$, and the DC/DC converter 1 can stably output, by adjusting a duty cycle $D_1$ when Q6 conducts, the target output voltage that needs to be output. It should be noted that, when a sum of the first sub-cycle, the second sub-cycle, and a fifth sub-cycle is the first working cycle, and Q5 to Q7 are cut off in the fifth sub-cycle, the voltage at the output terminal of the DC/DC converter 1 may still be $V_{out}=V_1*D_1+V_2$, and the DC/DC converter 1 can stably output, by adjusting the duty cycle $D_1$ when Q6 conducts, the target output voltage that needs to be output.

It may be understood that when the voltage $V_{in}$ at the input terminal of the DC/DC converter 1 is less than the preset voltage, and an output voltage of the first rectifier circuit 13 and an output voltage of the second rectifier circuit 14 that are obtained after the transformer 12, the first rectifier circuit 13, and the second rectifier circuit 14 perform voltage conversion and rectification on $V_{in}$ do not reach the target output voltage, the voltage management circuit 15 may decrease, by controlling working statuses of the switching transistors in the voltage management circuit 15, the output voltage of the first rectifier circuit 13, to ensure that a sum of the output voltage of the first rectifier circuit 13 and the output voltage of the second rectifier circuit 14, which is obtained after the voltage is decreased, is the target output voltage, that is, the voltage at the output terminal of the DC/DC converter 1 is the target output voltage.

In another optional embodiment, when the voltage $V_{in}$ at the input terminal of the DC/DC converter 1 is greater than or equal to the preset voltage, the controller controls Q5 and Q6 to conduct in the first sub-cycle, where the preset voltage is a product of the target output voltage and N1. Because Q6 and Q7 complementarily conduct, and Q7 is cut off when Q6 conducts, in the first sub-cycle, a current flows from the positive output terminal of the second rectifier circuit 14 to the negative output terminal of the second rectifier circuit 14 through L1, Q6, and Q5 in sequence. The two output terminals of the first rectifier circuit 13 are connected to the two output terminals of the DC/DC converter 1 in the first sub-cycle, and the first terminal (that is, one terminal of L1 connected to the drain of Q6) of the branch in which the output terminal of the second rectifier circuit 14 is disposed (that is, the branch formed by serially connecting the output terminal of the second rectifier circuit 14 to L1) is connected to the first output terminal (that is, the negative output terminal of the DC/DC converter 1) of the DC/DC converter 1; at the same time, the current variation on L1 in the first sub-cycle is $\Delta I_1=V_2*D_1*T/L$, where L is the inductance of L1, and $D_1$ is the ratio of the first sub-cycle to the first working cycle T, that is, the duty cycle when Q6 conducts. In addition, when Q5 and Q7 conduct in the second sub-cycle, because Q6 and Q7 complementarily conduct, and Q6 is cut off when Q7 conducts, in the second sub-cycle, the current flows from the positive output terminal of the second rectifier circuit 14 to the positive output terminal of the DC/DC converter 1 through L1 and Q7. In the second sub-cycle, the branch in which the output terminal of the second rectifier circuit 14 is disposed (that is, the branch formed by serially connecting the output terminal of the second rectifier circuit 14 to L1) and the output terminal of the first rectifier circuit 13 are connected in parallel to the two output terminals of the DC/DC converter 1. At the same time, the current variation on L1 in the second sub-cycle is $\Delta I_2=(V_{out}-V_2)*(1-D_1)*T/L$. The sum of the first sub-cycle and the second sub-cycle may be the first working cycle, or may be a portion of the first working cycle.

When the inductor is stable, the current variation in a process of storing energy in the inductor is equal to the current variation in a process of releasing the energy from the inductor. Therefore, when the sum of the first sub-cycle and the second sub-cycle is the first working cycle, $\Delta I_1=\Delta I_2$ can be obtained. In this case, the voltage at the output terminal of the DC/DC converter 1 is $V_{out}=V_2/(1-D_1)$, and the DC/DC converter 1 can stably output, by adjusting the duty cycle $D_1$ when Q6 conducts, the target output voltage that needs to be output. It should be noted that, when the sum of the first sub-cycle, the second sub-cycle, and the fifth sub-cycle is the first working cycle, and Q5 to Q7 are cut off in the fifth sub-cycle, the voltage at the output terminal of the DC/DC converter 1 may still be $V_{out}=V_2/(1-D_1)$, and the DC/DC converter 1 can stably output, by adjusting the duty cycle $D_1$ when Q6 conducts, the target output voltage that needs to be output.

It may be understood that when the voltage $V_{in}$ at the input terminal of the DC/DC converter 1 is greater than or equal to the preset voltage, the output voltage of the first rectifier circuit 13 that is obtained after the transformer 12, the first rectifier circuit 13, and the second rectifier circuit 14 perform the voltage conversion and rectification on $V_{in}$ do not reach the target output voltage, and the output voltage of the second rectifier circuit 14 is greater than the target output voltage, the voltage management circuit 15 may increase, by controlling the working statuses of the switching transistors in the voltage management circuit 15, the output voltage of the second rectifier circuit 14, to ensure that the energy stored in L1 may be discharged to C1, and the output voltage of the first rectifier circuit 13 is increased to the target output voltage, that is, the voltage at the output terminal of the DC/DC converter 1 is the target output voltage.

The following uses an example in which the controller is disposed outside the voltage management circuit 15.

In an optional implementation, the controller sends first control signal and a second control signal to the voltage management circuit 15. The voltage management circuit 15 controls, in the first sub-cycle based on the received first control signal, the output terminal of the first rectifier circuit 13, the output terminal of the second rectifier circuit 14, and the output terminal of the DC/DC converter 1 to be in the first connection relationship, and controls, in the second sub-cycle based on the received second control signal, the output terminal of the first rectifier circuit 13, the output terminal of the second rectifier circuit 14, and the output terminal of the DC/DC converter 1 to be in the second connection relationship.

The first connection relationship and the second connection relationship may be any two of the following connection relationships:

the output terminal of the first rectifier circuit 13 and a branch in which the output terminal of the second rectifier circuit 14 is disposed are connected in series and then connected to the output terminal of the DC/DC converter 1;

the branch in which the output terminal of the second rectifier circuit 14 is disposed is connected to the output terminal of the DC/DC converter 1;

the output terminal of the first rectifier circuit 13 is connected to the output terminal of the DC/DC converter 1, and a first terminal of the branch in which the output terminal of the second rectifier circuit 14 is disposed is connected to a first output terminal of the DC/DC converter 1; and the branch in which the output terminal of the second rectifier circuit 14 is disposed and the output terminal of the first rectifier circuit 13 are connected in parallel to the output terminal of the DC/DC converter 1.

Specifically, after the DC/DC converter 1 starts to work, the controller controls, by sending a PWM wave to Q1 to Q4, Q1 and Q4 to conduct in a third sub-cycle of a second working cycle, and controls Q2 and Q3 to conduct in a fourth sub-cycle of the second working cycle. Both the third sub-cycle and the fourth sub-cycle are half of the second working cycle. Therefore, a direct current at the input terminal of the DC/DC converter 1 may be converted into a sinusoidal alternating current by using the inverter circuit 11. The transformer 12 performs voltage conversion on the alternating current output by the inverter circuit 11, and outputs the converted alternating current to the output terminal of the first rectifier circuit 13 and the output terminal of the second rectifier circuit 14. The first rectifier circuit 13 rectifies an alternating current output by the first secondary-side winding 122 to obtain an output voltage of the first rectifier circuit 13, that is, a direct current voltage $V_1=V_{in}/N11$. The second rectifier circuit 14 rectifies an alternating current output by the second secondary-side winding 123 to obtain an output voltage of the second rectifier circuit 14, that is, a direct current voltage $V_2=V_{in}/N12$, where $V_{in}$ is a voltage at the input terminal of the DC/DC converter 1, N11 is a ratio of a number of turns of the first primary-side winding 121 to a number of turns of the first secondary-side winding 122, and N12 is a ratio of the number of turns of the first primary-side winding 121 to a number of turns of the second secondary-side winding 123. The second working cycle herein may be the same as or different from the first working cycle. This is not limited in this specification.

In addition, after the DC/DC converter 1 starts to work, the controller obtains a voltage $V_{in}$ of the input terminal of the DC/DC converter 1, and sends a control signal to the voltage management circuit 15 based on $V_{in}$, so that the voltage management circuit 15 may control, based on the received control signal, a connection relationship among the output terminal of the first rectifier circuit 13, the output terminal of the second rectifier circuit 14, and the output terminal of the DC/DC converter 1.

In an optional embodiment, when the voltage $V_{in}$ at the input terminal of the DC/DC converter 1 is less than a preset voltage, the controller sends the first control signal and the second control signal to the voltage management circuit 15, where the preset voltage is a product of the target output voltage and N1. For Q5 and Q6 in the voltage management circuit 15, in the first sub-cycle based on the received first control signal, Q5 is cut off and Q6 conducts. Because Q6 and Q7 complementarily conduct, and Q7 is cut off when Q6 conducts, in the first sub-cycle, a current flows from the positive output terminal of the second rectifier circuit 14 to the positive output terminal of the DC/DC converter 1 through L1, Q6, and C1 in sequence; therefore, in the first sub-cycle, the output terminal of the first rectifier circuit 13 and the branch in which the output terminal of the second rectifier circuit 14 is disposed (that is, a branch formed by serially connecting the output terminal of the second rectifier circuit 14 to L1) are connected in series and then connected to two output terminals of the DC/DC converter 1; at the same time, a current variation on L1 in the first sub-cycle is $\Delta I_1=(V_1+V_2-V_{out})*D_1*T/L$, where L is inductance of L1, and $D_1$ is a ratio of the first sub-cycle to the first working cycle T, that is, a duty cycle when Q6 conducts. For Q5 and Q7 in the voltage management circuit 15, in the second sub-cycle based on the received second control signal, Q5 is cut off and Q7 conducts. Because Q6 and Q7 complementarily conduct, and Q6 is cut off when Q7 conducts, in the second sub-cycle, the current flows from the positive output terminal of the second rectifier circuit 14 to the positive output terminal of the DC/DC converter 1 through L1 and Q7; therefore, in the second sub-cycle, the branch in which the output terminal of the second rectifier circuit 14 is disposed (that is, the branch formed by serially connecting the output terminal of the second rectifier circuit 14 to L1) is connected to two output terminals of the DC/DC converter 1; at the same time, the current variation on L1 in the second sub-cycle is $\Delta I_2=(V_{out}-V_2)*(1-D_1)*T/L$. The sum of the first sub-cycle and the second sub-cycle may be the first working cycle, or may be a portion of the first working cycle.

When the inductor is stable, a current variation in a process of storing energy in the inductor is equal to a current variation in a process of releasing the energy from the inductor. Therefore, when the sum of the first sub-cycle and the second sub-cycle is the first working cycle, $\Delta I_1=\Delta I_2$ can be obtained. In this case, a voltage at the output terminal of the DC/DC converter 1 is $V_{out}=V_1*D_1+V_2$, and the DC/DC converter 1 can stably output, by adjusting a duty cycle $D_1$ when Q6 conducts, the target output voltage that needs to be output. It should be noted that, when a sum of the first sub-cycle, the second sub-cycle, and a fifth sub-cycle is the first working cycle, and Q5 to Q7 are cut off in the fifth sub-cycle, the voltage at the output terminal of the DC/DC converter 1 may still be $V_{out}=V_1*D_1+V_2$, and the DC/DC converter 1 can stably output, by adjusting the duty cycle $D_1$ when Q6 conducts, the target output voltage that needs to be output.

It may be understood that when the voltage $V_{in}$ at the input terminal of the DC/DC converter 1 is less than the preset voltage, and an output voltage of the first rectifier circuit 13 and an output voltage of the second rectifier circuit 14 that are obtained after the transformer 12, the first rectifier circuit 13, and the second rectifier circuit 14 perform voltage conversion and rectification on $V_{in}$ do not reach the target output voltage, the voltage management circuit 15 may decrease, by controlling working statuses of the switching transistors in the voltage management circuit 15, the output voltage of the first rectifier circuit 13, to ensure that a sum of the output voltage of the first rectifier circuit 13 and the output voltage of the second rectifier circuit 14, which is obtained after the voltage is decreased, is the target output voltage, that is, the voltage at the output terminal of the DC/DC converter 1 is the target output voltage.

In another optional embodiment, when the voltage $V_{in}$ at the input terminal of the DC/DC converter 1 is greater than or equal to the preset voltage, the controller sends the first control signal and the second control signal to the voltage management circuit 15, where the preset voltage is a product of the target output voltage and N1. For Q5 and Q6 in the voltage management circuit 15, in the first sub-cycle based on the received first control signal, Q5 conducts and Q6 conducts. Because Q6 and Q7 complementarily conduct, and Q7 is cut off when Q6 conducts, in the first sub-cycle, a current flows from the positive output terminal of the second rectifier circuit 14 to the negative output terminal of the second rectifier circuit 14 through L1, Q6, and Q5 in sequence; therefore, the two output terminals of the first rectifier circuit 13 are connected to the two output terminals of the DC/DC converter 1 in the first sub-cycle, and the first terminal (that is, one terminal of L1 connected to the drain of Q6) of the branch in which the output terminal of the second rectifier circuit 14 is disposed (that is, the branch formed by serially connecting the output terminal of the second rectifier circuit 14 to L1) is connected to the first output terminal (that is, the negative output terminal of the DC/DC converter 1) of the DC/DC converter 1; at the same time, the current variation on L1 in the first sub-cycle is $\Delta I_1=V_2*D_1*T/L$, where L is the inductance of L1, and $D_1$ is the ratio of the first sub-cycle to the first working cycle T, that is, the duty cycle when Q6 conducts. For Q5 and Q7 in the voltage management circuit 15, in the second sub-cycle based on the received second control signal, Q5 conducts and Q7 conducts. Because Q6 and Q7 complementarily conduct, and Q6 is cut off when Q7 conducts, in the second sub-cycle, the current flows from the positive output terminal of the second rectifier circuit 14 to the positive output terminal of the DC/DC converter 1 through L1 and Q7; therefore, in the second sub-cycle, the branch in which the output terminal of the second rectifier circuit 14 is disposed (that is, the branch formed by serially connecting the output terminal of the second rectifier circuit 14 to L1) and the output terminal of the first rectifier circuit 13 are connected in parallel to two output terminals of the DC/DC converter 1; at the same time, the current variation on L1 in the second sub-cycle is $\Delta I_2=(V_{out}-V_2)*(1-D_1)*T/L$. The sum of the first sub-cycle and the second sub-cycle may be the first working cycle, or may be a portion of the first working cycle.

When the inductor is stable, the current variation in a process of storing energy in the inductor is equal to the current variation in a process of releasing the energy from the inductor. Therefore, when the sum of the first sub-cycle and the second sub-cycle is the first working cycle, $\Delta I_1=\Delta I_2$ can be obtained. In this case, the voltage at the output terminal of the DC/DC converter 1 is $V_{out}=V_2/(1-D_1)$, and the DC/DC converter 1 can stably output, by adjusting the duty cycle $D_1$ when Q6 conducts, the target output voltage that needs to be output. It should be noted that, when the sum of the first sub-cycle, the second sub-cycle, and the fifth sub-cycle is the first working cycle, and Q5 to Q7 are cut off in the fifth sub-cycle, the voltage at the output terminal of the DC/DC converter 1 may still be $V_{out}=V_2/(1-D_1)$, and the DC/DC converter 1 can stably output, by adjusting the duty cycle $D_1$ when Q6 conducts, the target output voltage that needs to be output.

It may be understood that when the voltage $V_{in}$ at the input terminal of the DC/DC converter 1 is greater than or equal to the preset voltage, the output voltage of the first rectifier circuit 13 that is obtained after the transformer 12, the first rectifier circuit 13, and the second rectifier circuit 14 perform the voltage conversion and rectification on $V_{in}$ do not reach the target output voltage, and the output voltage of the second rectifier circuit 14 is greater than the target output voltage, the voltage management circuit 15 may increase, by controlling the working statuses of the switching transistors in the voltage management circuit 15, the output voltage of the second rectifier circuit 14, to ensure that the energy stored in L1 may be discharged to C1, and the output voltage of the first rectifier circuit 13 is increased to the target output voltage, that is, the voltage at the output terminal of the DC/DC converter 1 is the target output voltage.

In this embodiment, the voltage $V_{in}$ at the input terminal of the DC/DC converter 1 may be increased or decreased based on the preset N11 and N12, and $V_{in}$ may be further decreased based on a relationship between $V_{in}$ and a preset voltage by changing the connection relationship among the output terminal of the first rectifier circuit 13, the output terminal of the second rectifier circuit 14, and the output terminal of the DC/DC converter 1 by using the voltage management circuit 15. This ensures that the voltage stably output by the DC/DC converter 1 is the target output voltage regardless of $V_{in}$, expands the input voltage compatibility range of the DC/DC converter 1, and increases applicability.

For example, refer to FIG. 5. FIG. 5 is a schematic diagram of another structure of a DC/DC converter according to this specification. As shown in FIG. 5, the inverter circuit 11 includes switching transistors Q1 to Q4, Q8, and Q9. The switching transistors are metal-oxide semiconductor field-effect transistors MOSFETs. Q1 and Q2 are connected in series to form a first phase bridge arm, Q3 and Q4 are connected in series to form a second phase bridge arm, and Q8 and Q9 are connected in series to form a third phase bridge arm. A first terminal of the first phase bridge arm (that is, a drain of Q1), and a first terminal of the second phase bridge arm (that is, a drain of Q3) are connected to a first terminal (that is, the drain of Q8) of the third phase bridge arm to form a positive input terminal of the inverter circuit 11, that is, the positive input terminal of the DC/DC converter 1. A second terminal (that is, a source of Q2) of the first phase bridge arm, a second terminal (that is, a source of Q4) of the second phase bridge arm, and the second terminal (that is, a source of Q9) of the third phase bridge arm are connected to form a negative input terminal of the inverter circuit 11, that is, a negative input terminal of the DC/DC converter 1. A connection point between Q1 and Q2 forms the first output terminal out 111 of the inverter circuit 11, a connection point between Q3 and Q4 forms the second output terminal out 112 of the inverter circuit 11, and a connection point between Q8 and Q9 forms a third output terminal out 113 of the inverter circuit 11. The transformer 12 further includes a first iron core 124, a second primary-side winding 125, and a second iron core 126. The first primary-side winding 121 and the first secondary-side winding 122 are coupled to the first iron core 124, the second primary-side winding 125 and the second secondary-side winding 123 are coupled to the second iron core 126. The voltage management circuit 15 includes a first inductor L1, a first switching transistor Q5, a second switching transistor Q6, and a third switching transistor Q7. A first terminal (that is, a drain of Q7) of Q7 is connected to a first output terminal (that is, a positive output terminal of the first rectifier circuit 13) of the first rectifier circuit 13 and a second output terminal (that is, a positive output terminal of the DC/DC converter 1) of the DC/DC converter 1. A second terminal of Q7 (that is, a source of Q7) is connected to a first output terminal (that is, a positive output terminal of the second rectifier circuit 14) of the second rectifier circuit 14 through L1, and the second terminal of Q7 is connected to a first terminal of Q6 (that is, a drain of Q6), a second terminal (that is, a source of Q6) of Q6 is connected to a second output terminal (that is, a negative output terminal of the first rectifier circuit 13) of the first rectifier circuit 13 and a first terminal (that is, a drain of Q5) of Q5, and a second terminal (that is, a source of Q5) of Q5. A second output terminal (that is, a negative output terminal of the second rectifier circuit 14) of the second rectifier circuit 14 is connected to a first output terminal (a negative output terminal of the DC/DC converter 1) of the DC/DC converter 1.

Optionally, the DC/DC converter 1 further includes the first resonant circuit 16 and the second resonant circuit 17. The first resonant circuit 16 includes the inductor Lr1 and the capacitor Cr1. The first output terminal out 111 of the inverter circuit 11 is connected to the dotted terminal of the first primary-side winding 121 by using Lr1 and Cr1 in sequence. The first resonant circuit 16 is configured to convert a sinusoidal alternating current output by the inverter circuit 11 into a zero-crossing sinusoidal alternating current. The second resonant circuit 17 includes an inductor Lr2 and a capacitor Cr2. A third output terminal out 113 of the inverter circuit 11 is connected to an undotted terminal of the second primary-side winding 125 by using Lr2 and Cr2 in sequence. The second resonant circuit 17 is configured to convert a sinusoidal alternating current output by the inverter circuit 11 into a zero-crossing sinusoidal alternating current. A resonance parameter of the first resonant circuit 16 is the same as that of the second resonant circuit 17, that is, Lr1=Lr2, and Cr1=Cr2. Both the first resonant circuit 16 and the second resonant circuit 17 can reduce a loss of the switching transistor in the DC/DC converter 1 when the switching transistor switches between conduction and being cut off at a zero voltage or a zero current.

Optionally, the DC/DC converter 1 further includes capacitors C1 and C2. Two terminals of C1 are connected to two output terminals of the first rectifier circuit 13, and configured to filter and stabilize a direct current voltage output by the first rectifier circuit 13. Two terminals of C2 are connected to two output terminals of the second rectifier circuit 14, and configured to filter and stabilize a direct current voltage output by the second rectifier circuit 14. The switching transistors in FIG. 5 may also be IGBTs, triodes, or the like.

The following uses an example in which the controller is disposed inside the voltage management circuit 15.

In an optional implementation, after the DC/DC converter 1 starts to work, the controller in the voltage management circuit 15 controls working statuses of Q5 to Q7, to enable the output terminal of the first rectifier circuit 13, the output terminal of the second rectifier circuit 14, and the output terminal of the DC/DC converter 1 to be in the first connection relationship in the first sub-cycle of the first working cycle and to be in the second connection relationship in the second sub-cycle of the first working cycle.

The first connection relationship and the second connection relationship may be any two of the following connection relationships:

the output terminal of the first rectifier circuit 13 and a branch in which the output terminal of the second rectifier circuit 14 is disposed are connected in series and then connected to the output terminal of the DC/DC converter 1;

the branch in which the output terminal of the second rectifier circuit 14 is disposed is connected to the output terminal of the DC/DC converter 1;

the output terminal of the first rectifier circuit 13 is connected to the output terminal of the DC/DC converter 1, and a first terminal of the branch in which the output terminal of the second rectifier circuit 14 is disposed is connected to a first output terminal of the DC/DC converter 1; and the branch in which the output terminal of the second rectifier circuit 14 is disposed and the output terminal of the first rectifier circuit 13 are connected in parallel to the output terminal of the DC/DC converter 1.

Specifically, after the DC/DC converter 1 starts to work, the controller in the voltage management circuit 15 obtains the voltage $V_{in}$ at the input terminal of the DC/DC converter 1, and controls, based on $V_{in}$, working statuses of switching transistors in the inverter circuit 11 and the connection relationship among the output terminal of the first rectifier circuit 13, the output terminal of the second rectifier circuit 14, and the output terminal of the DC/DC converter 1.

In an optional embodiment, when the voltage $V_{in}$ at the input terminal of the DC/DC converter 1 is less than a preset voltage, the controller in the voltage management circuit 15 controls, by sending a PWM wave to Q1 to Q4, Q8, and Q9, Q1, Q4, and Q8 to be in the third sub-cycle of the second working cycle, and controls Q2, Q3, and Q9 to be in a fourth sub-cycle of the second working cycle. The preset voltage is a product of the target output voltage and N1. N1 is a ratio of a number of turns of the first primary-side winding 121 to a number of turns of the first secondary-side winding 122. Both the third sub-cycle and the fourth sub-cycle are half of the second working cycle. The second working cycle is the same as a working cycle of the first resonant circuit 16. The second working cycle herein may be the same as or different from the first working cycle. This is not limited in this specification. In the third sub-cycle, after a current flows from the positive input terminal of the DC/DC converter 1, a portion of the current flows to the negative input terminal of the DC/DC converter 1 through Q1, Lr1, Cr1, the first primary-side winding 121, and Q4 in sequence, and another portion of the current flows to the negative input terminal of the DC/DC converter 1 through Q8, Lr2, Cr2, the second primary-side winding 125, and Q4 in sequence. In the fourth sub-cycle, after the current flows from the positive input terminal of the DC/DC converter 1, one portion of the current flows to the negative input terminal of the DC/DC converter 1 through Q3, the first primary-side winding 121, Cr1, Lr1, and Q2 in sequence, and another portion of the current flows to the negative input terminal of the DC/DC converter 1 through Q3, the second primary-side winding 125, Cr2, Lr2, and Q9 in sequence. Therefore, in the second working cycle, the first primary-side winding 121 and the second primary-side winding 125 are connected in parallel to the two voltage input terminals of the DC/DC converter 1.

Because both the third sub-cycle and the fourth sub-cycle are half of the second working cycle, the inverter circuit 11 converts the direct current at the input terminal of the DC/DC converter 1 into a sinusoidal alternating current, and the first resonant circuit 16 and the second resonant circuit 17 converts the sinusoidal alternating current output by the inverter circuit 11 into a zero-crossing sinusoidal alternating current, and outputs the converted zero-crossing sinusoidal alternating current to the first primary-side winding 121 and the second primary-side winding 125. An alternating current flowing through the first primary-side winding 121 generates an alternating magnetic flux, the alternating magnetic flux induces an alternating current in the first secondary-side winding 122 under a magnetic conduction action of the first iron core 124, and the induced alternating current is output to the output terminal of the first rectifier circuit 13. An alternating current flowing through the second primary-side winding 125 generates an alternating magnetic flux, the alternating magnetic flux induces an alternating current in the second secondary-side winding 123 under a magnetic conduction action of the second iron core 126, and the induced alternating current is output to the output terminal of the second rectifier circuit 14. The first rectifier circuit 13 rectifies an alternating current output by the first secondary-side winding 122 to obtain an output voltage of the first rectifier circuit 13, that is, a direct current voltage $V_1=V_{in}/N1$. The second rectifier circuit 14 rectifies an alternating current output by the second secondary-side winding 123 to obtain an output voltage of the second rectifier circuit 14, that is, a direct current voltage $V_2=V_{in}/N2$, where $V_{in}$ is a voltage at the input terminal of the DC/DC converter 1, N1 is a ratio of a number of turns of the first primary-side winding 121 to a number of turns of the first secondary-side winding 122, and N2 is a ratio of the number of turns of the second primary-side winding 125 to a number of turns of the second secondary-side winding 123.

In addition, when the voltage $V_{in}$ at the input terminal of the DC/DC converter 1 is less than the preset voltage, the controller in the voltage management circuit 15 controls Q5 to be cut off and Q6 to conduct in the first sub-cycle. Because Q6 and Q7 complementarily conduct, and Q7 is cut off when Q6 conducts, in the first sub-cycle, a current flows from the positive output terminal of the second rectifier circuit 14 to the positive output terminal of the DC/DC converter 1 through L1, Q6, and C1 in sequence; therefore, in the first sub-cycle, the output terminal of the first rectifier circuit 13 and the branch in which the output terminal of the second rectifier circuit 14 is disposed (that is, a branch formed by serially connecting the output terminal of the second rectifier circuit 14 to L1) are connected in series and then connected to two output terminals of the DC/DC converter 1; at the same time, a current variation on L1 in the first sub-cycle is $\Delta I_1=(V_1+V_2-V_{out})*D_1*T/L$, where L is inductance of L1, and $D_1$ is a ratio of the first sub-cycle to the first working cycle T, that is, a duty cycle when Q6 conducts. In addition, when Q5 is cut off, and Q7 conducts in the second sub-cycle, because Q6 and Q7 are complementarily conducted, and Q6 is cut off when Q7 conducts, in the second sub-cycle, the current flows from the positive output terminal of the second rectifier circuit 14 to the positive output terminal of the DC/DC converter 1 through L1 and Q7; therefore, in the second sub-cycle, the branch in which the output terminal of the second rectifier circuit 14 is disposed (that is, the branch formed by serially connecting the output terminal of the second rectifier circuit 14 to L1) is connected to two output terminals of the DC/DC converter 1; at the same time, the current variation on L1 in the second sub-cycle is $\Delta I_2=(V_{out}-V_2)*(1-D_1)*T/L$. A sum of the first sub-cycle and the second sub-cycle may be the first working cycle, or may be a portion of the first working cycle.

When the inductor is stable, a current variation in a process of storing energy in the inductor is equal to a current variation in a process of releasing the energy from the inductor. Therefore, when the sum of the first sub-cycle and the second sub-cycle is the first working cycle, $\Delta I_1=\Delta I_2$ can be obtained. In this case, a voltage at the output terminal of the DC/DC converter 1 is $V_{out}=V_1*D_1+V_2$, and the DC/DC converter 1 can stably output, by adjusting a duty cycle $D_1$ when Q6 conducts, the target output voltage that needs to be output. It should be noted that, when a sum of the first sub-cycle, the second sub-cycle, and a fifth sub-cycle is the first working cycle, and Q5 to Q7 are cut off in the fifth sub-cycle, the voltage at the output terminal of the DC/DC converter 1 may still be $V_{out}=V_1*D_1+V_2$, and the DC/DC converter 1 can stably output, by adjusting the duty cycle $D_1$ when Q6 conducts, the target output voltage that needs to be output.

It may be understood that, when the voltage $V_{in}$ at the input terminal of the DC/DC converter 1 is less than the preset voltage, the voltage management circuit 15 may decrease the output voltage of the first rectifier circuit 14 by controlling the inverter circuit 11 to enable the first primary-side winding 121 and the second primary-side winding 125 to be connected in parallel to the two voltage input terminals of the DC/DC converter 1, and controlling the working statuses of the switching transistors in the voltage management circuit 15. Therefore, after the voltage is decreased, it is ensured that a sum of the output voltage of the first rectifier circuit 13 and the output voltage of the second rectifier circuit 14 is the target output voltage, that is, it is ensured that the voltage at the output terminal voltage of the DC/DC converter 1 is the target output voltage.

In an optional embodiment, when the voltage $V_{in}$ at the input terminal of the DC/DC converter 1 is greater than or equal to the preset voltage, the controller in the voltage management circuit 15 controls, by sending a PWM wave to Q1 to Q4, Q8, and Q9, Q3 and Q4 to be cut off, Q1 and Q9 to conduct in the third sub-cycle of the second working cycle, and Q2 and Q8 to conduct in the fourth sub-cycle of the second working cycle. The preset voltage is a product of the target output voltage and N1. N1 is the ratio of a number of turns of the first primary-side winding 121 to a number of turns of the first secondary-side winding 122. Both the third sub-cycle and the fourth sub-cycle are half of the second working cycle. The second working cycle is the same as a working cycle of the first resonant circuit 16. The second working cycle herein may be the same as or different from the first working cycle. This is not limited in this specification. In a third cycle, after the current flows from the positive input terminal of the DC/DC converter 1, the current flows to the negative input terminal of the DC/DC converter 1 through Q1, Lr1, Cr1, the first primary-side winding 121, the second primary-side winding 125, Cr2, Lr2, and Q9 in sequence. In the fourth sub-cycle, after the current flows from the positive input terminal of the DC/DC converter 1, the current flows to the negative input terminal of the DC/DC converter 1 through Q8, Lr2, Cr2, the second primary-side winding 125, the first primary-side winding 121, Cr1, Lr1, and Q2 in sequence. Therefore, in the second working cycle, the first primary-side winding 121 and the second primary-side winding 125 are connected in series and then connected to the two voltage input terminals of the DC/DC converter 1.

Because both the third sub-cycle and the fourth sub-cycle are half of the second working cycle, the inverter circuit 11 converts the direct current at the input terminal of the DC/DC converter 1 into a sinusoidal alternating current, and the first resonant circuit 16 and the second resonant circuit 17 converts the sinusoidal alternating current output by the inverter circuit 11 into a zero-crossing sinusoidal alternating current, and outputs the converted zero-crossing sinusoidal alternating current to the first primary-side winding 121 and the second primary-side winding 125. An alternating current flowing through the first primary-side winding 121 generates an alternating magnetic flux, the alternating magnetic flux induces an alternating current in the first secondary-side winding 122 under a magnetic conduction action of the first iron core 124, and the induced alternating current is output to the output terminal of the first rectifier circuit 13. An alternating current flowing through the second primary-side winding 125 generates an alternating magnetic flux, the alternating magnetic flux induces an alternating current in the second secondary-side winding 123 under a magnetic conduction action of the second iron core 126, and the induced alternating current is output to the output terminal of the second rectifier circuit 14. The first rectifier circuit 13 rectifies the alternating current output by the first secondary-side winding 122 to obtain the output voltage of the first rectifier circuit 13, that is, the direct current voltage $V_1=V_{in1}/N1$. The second rectifier circuit 14 rectifies the alternating current output by the second secondary-side winding 123 to obtain the output voltage of the second rectifier circuit 14, that is, the direct current voltage $V_2=V_{in2}/N2$, where $V_{in1}=V_{in}*Z1/(Z1+Z2)$, $V_{in2}=V_{in}*Z2/(Z1+Z2)$, Z1 is alternating current impedance obtained after the first primary-side winding 121 is connected in parallel to C1, Z2 is alternating current impedance obtained after the second primary-side winding 125 is connected in parallel to C2, and $V_{in}$ is a voltage at the input terminal of the DC/DC converter 1.

In addition, when the voltage $V_{in}$ at the input terminal of the DC/DC converter 1 is greater than or equal to the preset voltage, the controller in the voltage management circuit 15 controls Q5 to conduct and Q6 to conduct the first sub-cycle. Because Q6 and Q7 complementarily conduct, and Q7 is cut off when Q6 conducts, in the first sub-cycle, a current flows from the positive output terminal of the second rectifier circuit 14 to the negative output terminal of the second rectifier circuit 14 through L1, Q6, and Q5 in sequence; therefore, the two output terminals of the first rectifier circuit 13 are connected to the two output terminals of the DC/DC converter 1 in the first sub-cycle, and the first terminal (that is, one terminal of L1 connected to the drain of Q6) of the branch in which the output terminal of the second rectifier circuit 14 is disposed (that is, the branch formed by serially connecting the output terminal of the second rectifier circuit 14 to L1) is connected to the first output terminal (that is, the negative output terminal of the DC/DC converter 1) of the DC/DC converter 1; at the same time, the current variation on L1 in the first sub-cycle is $\Delta I_1=V_2*D_1*T/L$, where L is the inductance of L1, and $D_1$ is the ratio of the first sub-cycle to the first working cycle T, that is, the duty cycle when Q6 conducts. In addition, when Q5 and Q7 conduct in the second sub-cycle, because Q6 and Q7 complementarily conduct, and Q6 is cut off when Q7 conducts, in the second sub-cycle, the current flows from the positive output terminal of the second rectifier circuit 14 to the positive output terminal of the DC/DC converter 1 through L1 and Q7; therefore, in the second sub-cycle, the branch in which the output terminal of the second rectifier circuit 14 is disposed (that is, the branch formed by serially connecting the output terminal of the second rectifier circuit 14 to L1) and the output terminal of the first rectifier circuit 13 are connected in parallel to the two output terminals of the DC/DC converter 1; at the same time, the current variation on L1 in the second sub-cycle is $\Delta I_2=(V_{out}-V_2)*(1-D_1)*T/L$. The sum of the first sub-cycle and the second sub-cycle may be the first working cycle, or may be a portion of the first working cycle.

When the inductor is stable, the current variation in a process of storing energy in the inductor is equal to the current variation in a process of releasing the energy from the inductor. Therefore, when the sum of the first sub-cycle and the second sub-cycle is the first working cycle, $\Delta I_1=\Delta I_2$ can be obtained. In this case, the voltage at the output terminal of the DC/DC converter 1 is $V_{out}=V_2/(1-D_1)$, and the DC/DC converter 1 can stably output, by adjusting the duty cycle $D_1$ when Q6 conducts, the target output voltage that needs to be output. It should be noted that, when the sum of the first sub-cycle, the second sub-cycle, and the fifth sub-cycle is the first working cycle, and Q5 to Q7 are cut off in the fifth sub-cycle, the voltage at the output terminal of the DC/DC converter 1 may still be $V_{out}=V_2/(1-D_1)$, and the DC/DC converter 1 can stably output, by adjusting the duty cycle $D_1$ when Q6 conducts, the target output voltage that needs to be output.

It may be understood that, when the voltage $V_{in}$ at the input terminal of the DC/DC converter 1 is greater than or equal to the preset voltage, the voltage management circuit 15 may increase the output voltage of the second rectifier circuit 14 by controlling the first primary-side winding 121 and the second primary-side winding 125 to be connected in series and then connected to the two voltage input terminals of the DC/DC converter 1, and controlling the working statuses of the switching transistors in the voltage management circuit 15. Therefore, the energy stored in L1 may be discharged to C1, to ensure that the output voltage of the first rectifier circuit 13 is increased to the target output voltage, that is, it is ensured that the voltage at the output terminal of the DC/DC converter 1 is the target output voltage.

The following uses an example in which the controller is disposed outside the voltage management circuit 15.

In an optional implementation, the controller sends first control signal and a second control signal to the voltage management circuit 15. The voltage management circuit 15 controls, in the first sub-cycle based on the received first control signal, the output terminal of the first rectifier circuit 13, the output terminal of the second rectifier circuit 14, and the output terminal of the DC/DC converter 1 to be in the first connection relationship, and controls, in the second sub-cycle based on the received second control signal, the output terminal of the first rectifier circuit 13, the output terminal of the second rectifier circuit 14, and the output terminal of the DC/DC converter 1 to be in the second connection relationship.

The first connection relationship and the second connection relationship may be any two of the following connection relationships:

the output terminal of the first rectifier circuit 13 and a branch in which the output terminal of the second rectifier circuit 14 is disposed are connected in series and then connected to the output terminal of the DC/DC converter 1;

the branch in which the output terminal of the second rectifier circuit 14 is disposed is connected to the output terminal of the DC/DC converter 1;

the output terminal of the first rectifier circuit 13 is connected to the output terminal of the DC/DC converter 1, and a first terminal of the branch in which the output terminal of the second rectifier circuit 14 is disposed is connected to a first output terminal of the DC/DC converter 1; and the branch in which the output terminal of the second rectifier circuit 14 is disposed and the output terminal of the first rectifier circuit 13 are connected in parallel to the output terminal of the DC/DC converter 1.

Specifically, after the DC/DC converter 1 starts to work, the controller obtains a voltage $V_{in}$ of the input terminal of the DC/DC converter 1, and sends, based on $V_{in}$, a control signal to the inverter circuit 11 and the voltage management circuit 15, so that the inverter circuit 11 may control, based on the received control signal, the working statuses of the switching transistors in the inverter circuit 11, and the voltage management circuit 15 may control, based on the received control signal, the connection relationship among the output terminal of the first rectifier circuit 13, the output terminal of the second rectifier circuit 14, and the output terminal of the DC/DC converter 1.

In an optional embodiment, when the voltage $V_{in}$ at the input terminal of the DC/DC converter 1 is less than the preset voltage, the controller sends a third control signal to the inverter circuit 11, where the preset voltage is a product of the target output voltage and N1, and N1 is a ratio of a number of turns of the first primary-side winding 121 to a number of turns of the first secondary-side winding 122. For Q1 to Q4, Q8, and Q9 in the inverter circuit 11, based on the received third control signal, Q1, Q4, and Q8 conduct in the third sub-cycle of the second working cycle, and Q2, Q3, and Q9 conduct in the fourth sub-cycles of the second working cycle. Both the third sub-cycle and the fourth sub-cycle are half of the second working cycle, and the second working cycle is the same as a working cycle of the first resonant circuit 16. The second working cycle herein may be the same as or different from the first working cycle. This is not limited in this specification. In the third sub-cycle, after a current flows from the positive input terminal of the DC/DC converter 1, a portion of the current flows to the negative input terminal of the DC/DC converter 1 through Q1, Lr1, Cr1, the first primary-side winding 121, and Q4 in sequence, and another portion of the current flows to the negative input terminal of the DC/DC converter 1 through Q8, Lr2, Cr2, the second primary-side winding 125, and Q4 in sequence. In the fourth sub-cycle, after the current flows from the positive input terminal of the DC/DC converter 1, one portion of the current flows to the negative input terminal of the DC/DC converter 1 through Q3, the first primary-side winding 121, Cr1, Lr1, and Q2 in sequence, and another portion of the current flows to the negative input terminal of the DC/DC converter 1 through Q3, the second primary-side winding 125, Cr2, Lr2, and Q9 in sequence. Therefore, in the second working cycle, the first primary-side winding 121 and the second primary-side winding 125 are connected in parallel to the two voltage input terminals of the DC/DC converter 1.

Because both the third sub-cycle and the fourth sub-cycle are half of the second working cycle, the inverter circuit 11 converts the direct current at the input terminal of the DC/DC converter 1 into a sinusoidal alternating current, and the first resonant circuit 16 and the second resonant circuit 17 converts the sinusoidal alternating current output by the inverter circuit 11 into a zero-crossing sinusoidal alternating current, and outputs the converted zero-crossing sinusoidal alternating current to the first primary-side winding 121 and the second primary-side winding 125. An alternating current flowing through the first primary-side winding 121 generates an alternating magnetic flux, the alternating magnetic flux induces an alternating current in the first secondary-side winding 122 under a magnetic conduction action of the first iron core 124, and the induced alternating current is output to the output terminal of the first rectifier circuit 13. An alternating current flowing through the second primary-side winding 125 generates an alternating magnetic flux, the alternating magnetic flux induces an alternating current in the second secondary-side winding 123 under a magnetic conduction action of the second iron core 126, and the induced alternating current is output to the output terminal of the second rectifier circuit 14. The first rectifier circuit 13 rectifies an alternating current output by the first secondary-side winding 122 to obtain an output voltage of the first rectifier circuit 13, that is, a direct current voltage $V_1=V_{in}/N1$. The second rectifier circuit 14 rectifies an alternating current output by the second secondary-side winding 123 to obtain an output voltage of the second rectifier circuit 14, that is, a direct current voltage $V_2=V_{in}/N2$, where $V_{in}$ is a voltage at the input terminal of the DC/DC converter 1, N1 is a ratio of a number of turns of the first primary-side winding 121 to a number of turns of the first secondary-side winding 122, and N2 is a ratio of the number of turns of the second primary-side winding 125 to a number of turns of the second secondary-side winding 123.

In addition, when the voltage $V_{in}$ at the input terminal of the DC/DC converter 1 is less than a preset voltage, the controller sends the first control signal and the second control signal to the voltage management circuit 15. For Q5 and Q6 in the voltage management circuit 15, Q5 is cut off and Q6 conducts in the first sub-cycle based on the received first control signal. Because Q6 and Q7 complementarily conduct, and Q7 is cut off when Q6 conducts, in the first sub-cycle, a current flows from the positive output terminal of the second rectifier circuit 14 to the positive output terminal of the DC/DC converter 1 through L1, Q6, and C1 in sequence. In the first sub-cycle, the output terminal of the first rectifier circuit 13 and the branch in which the output terminal of the second rectifier circuit 14 is disposed (that is, a branch formed by serially connecting the output terminal of the second rectifier circuit 14 to L1) are connected in series and then connected to the two output terminals of the DC/DC converter 1. At the same time, a current variation on L1 in the first sub-cycle is $\Delta I_1=(V_1+V_2-V_{out})*D_1*T/L$, where L is inductance of L1, and $D_1$ is a ratio of the first sub-cycle to the first working cycle T, that is, a duty cycle when Q6 conducts. For Q5 and Q7 in the voltage management circuit 15, Q5 is cut off and Q7 conducts in the second sub-cycle based on the received second control signal. Because Q6 and Q7 complementarily conduct, and Q6 is cut off when Q7 conducts, in the second sub-cycle, a current flows from the positive output terminal of the second rectifier circuit 14 to the positive output terminal of the DC/DC converter 1 through L1 and Q7. In the second sub-cycle, the branch in which the output terminal of the second rectifier circuit 14 is disposed (that is, the branch formed by serially connecting the output terminal of the second rectifier circuit 14 to L1) is connected to two output terminals of the DC/DC converter 1. At the same time, the current variation on L1 in the second sub-cycle is $\Delta I_2 = (V_{out} - V_2)*(1-D_1)*T/L$. The sum of the first sub-cycle and the second sub-cycle may be the first working cycle, or may be a portion of the first working cycle.

When the inductor is stable, a current variation in a process of storing energy in the inductor is equal to a current variation in a process of releasing the energy from the inductor. Therefore, when a sum of the first sub-cycle and the second sub-cycle is the first working cycle, $\Delta I_1 = \Delta I_2$ can be obtained. In this case, a voltage at the output terminal of the DC/DC converter 1 is $V_{out} = V_1 * D_1 + V_2$, and the DC/DC converter 1 can stably output, by adjusting a duty cycle $D_1$ when Q6 conducts, the target output voltage that needs to be output. It should be noted that, when a sum of the first sub-cycle, the second sub-cycle, and a fifth sub-cycle is the first working cycle, and Q5 to Q7 are cut off in a fifth sub-cycle, the voltage at the output terminal of the DC/DC converter 1 may still be $V_{out} = V_1 * D_1 + V_2$, and the DC/DC converter 1 can stably output, by adjusting the duty cycle $D_1$ when Q6 conducts, the target output voltage that needs to be output.

It may be understood that, when the voltage $V_{in}$ at the input terminal of the DC/DC converter 1 is less than the preset voltage, the voltage management circuit 15 may decrease the output voltage of the first rectifier circuit 14 by controlling the inverter circuit 11 to enable the first primary-side winding 121 and the second primary-side winding 125 to be connected in parallel to the two voltage input terminals of the DC/DC converter 1, and controlling the working statuses of the switching transistors in the voltage management circuit 15. Therefore, after the voltage is decreased, it is ensured that a sum of the output voltage of the first rectifier circuit 13 and the output voltage of the second rectifier circuit 14 is the target output voltage, that is, it is ensured that the voltage at the output terminal voltage of the DC/DC converter 1 is the target output voltage.

In another optional embodiment, when the voltage $V_{in}$ at the input terminal of the DC/DC converter 1 is greater than or equal to the preset voltage, the controller sends a third control signal to the inverter circuit 11, where the preset voltage is a product of the target output voltage and N1, and N1 is a ratio of a number of turns of the first primary-side winding 121 to a number of turns of the first secondary-side winding 122. For Q1 to Q4, Q8, and Q9 in the inverter circuit 11, based on the received third control signal, Q3 and Q4 are cut off, Q1 and Q9 conduct in the third sub-cycle of the second working cycle, and Q2 and Q8 conduct in the fourth sub-cycles of the second working cycle. Both the third sub-cycle and the fourth sub-cycle are half of the second working cycle, and the second working cycle is the same as a working cycle of the first resonant circuit 16. The second working cycle herein may be the same as or different from the first working cycle. This is not limited in this specification. In a third cycle, after the current flows from the positive input terminal of the DC/DC converter 1, the current flows to the negative input terminal of the DC/DC converter 1 through Q1, Lr1, Cr1, the first primary-side winding 121, the second primary-side winding 125, Cr2, Lr2, and Q9 in sequence. In the fourth sub-cycle, after the current flows from the positive input terminal of the DC/DC converter 1, the current flows to the negative input terminal of the DC/DC converter 1 through Q8, Lr2, Cr2, the second primary-side winding 125, the first primary-side winding 121, Cr1, Lr1, and Q2 in sequence. Therefore, in the second working cycle, the first primary-side winding 121 and the second primary-side winding 125 are connected in series and then connected to the two voltage input terminals of the DC/DC converter 1.

Because both the third sub-cycle and the fourth sub-cycle are half of the second working cycle, the inverter circuit 11 converts the direct current at the input terminal of the DC/DC converter 1 into a sinusoidal alternating current, and the first resonant circuit 16 and the second resonant circuit 17 converts the sinusoidal alternating current output by the inverter circuit 11 into a zero-crossing sinusoidal alternating current, and outputs the converted zero-crossing sinusoidal alternating current to the first primary-side winding 121 and the second primary-side winding 125. An alternating current flowing through the first primary-side winding 121 generates an alternating magnetic flux, the alternating magnetic flux induces an alternating current in the first secondary-side winding 122 under a magnetic conduction action of the first iron core 124, and the induced alternating current is output to the output terminal of the first rectifier circuit 13. An alternating current flowing through the second primary-side winding 125 generates an alternating magnetic flux, the alternating magnetic flux induces an alternating current in the second secondary-side winding 123 under a magnetic conduction action of the second iron core 126, and the induced alternating current is output to the output terminal of the second rectifier circuit 14. The first rectifier circuit 13 rectifies the alternating current output by the first secondary-side winding 122 to obtain the output voltage of the first rectifier circuit 13, that is, the direct current voltage $V_1 = V_{in1}/N1$. The second rectifier circuit 14 rectifies the alternating current output by the second secondary-side winding 123 to obtain the output voltage of the second rectifier circuit 14, that is, the direct current voltage $V_2 = V_2/N2$, where $V_{in1} = V_{in}*Z1/(Z1+Z2)$, $V_{in2} = V_{in}*Z2/(Z1+Z2)$, Z1 is alternating current impedance obtained after the first primary-side winding 121 is connected in parallel to C1, Z2 is alternating current impedance obtained after the second primary-side winding 125 is connected in parallel to C2, and $V_{in}$ is a voltage at the input terminal of the DC/DC converter 1.

In addition, when the voltage $V_{in}$ at the input terminal of the DC/DC converter 1 is greater than or equal to the preset voltage, the controller sends the first control signal and the second control signal to the voltage management circuit 15. For Q5 and Q6 in the voltage management circuit 15, in the first sub-cycle based on the received first control signal, Q5 and Q6 conduct. Because Q6 and Q7 complementarily conduct, and Q7 is cut off when Q6 conducts, in the first sub-cycle, a current flows from the positive output terminal of the second rectifier circuit 14 to the negative output terminal of the second rectifier circuit 14 through L1, Q6, and Q5 in sequence. The two output terminals of the first rectifier circuit 13 are connected to the two output terminals of the DC/DC converter 1 in the first sub-cycle, and the first terminal (that is, one terminal of L1 connected to the drain of Q6) of the branch in which the output terminal of the second rectifier circuit 14 is disposed (that is, the branch formed by serially connecting the output terminal of the second rectifier circuit 14 to L1) is connected to the first output terminal (that is, the negative output terminal of the DC/DC converter 1) of the DC/DC converter 1. At the same time, the current variation on L1 in the first sub-cycle is $\Delta I_1 = V_2 * D_1 * T/L$, where L is the inductance of L1, and $D_1$ is the ratio of the first sub-cycle to the first working cycle T, that is, the duty cycle when Q6 conducts. For Q5 and Q7 in the voltage management circuit 15, in the second sub-cycle based on the received second control signal, Q5 and Q7 conduct. Because Q6 and Q7 complementarily conduct, and Q6 is cut off when Q7 conducts, in the second sub-cycle, the current flows from the positive output terminal of the second rectifier circuit 14 to the positive output terminal of the DC/DC converter 1 through L1 and Q7. In the second sub-cycle, the branch in which the output terminal of the second rectifier circuit 14 is disposed (that is, the branch formed by serially connecting the output terminal of the second rectifier circuit 14 to L1) and the output terminal of the first rectifier circuit 13 are connected in parallel to two output terminals of the DC/DC converter 1; at the same time, the current variation on L1 in the second sub-cycle is $\Delta I_2 = (V_{out} - V_2) * (1 - D_1) * T/L$. The sum of the first sub-cycle and the second sub-cycle may be the first working cycle, or may be a portion of the first working cycle.

When the inductor is stable, the current variation in a process of storing energy in the inductor is equal to the current variation in a process of releasing the energy from the inductor. Therefore, when the sum of the first sub-cycle and the second sub-cycle is the first working cycle, $\Delta I_1 = \Delta I_2$ can be obtained. In this case, the voltage at the output terminal of the DC/DC converter 1 is $V_{out} = V_2/(1-D_1)$, and the DC/DC converter 1 can stably output, by adjusting the duty cycle $D_1$ when Q6 conducts, the target output voltage that needs to be output. It should be noted that, when the sum of the first sub-cycle, the second sub-cycle, and the fifth sub-cycle is the first working cycle, and Q5 to Q7 are cut off in the fifth sub-cycle, the voltage at the output terminal of the DC/DC converter 1 may still be $V_{out} = V_2/(1-D_1)$, and the DC/DC converter 1 can stably output, by adjusting the duty cycle $D_1$ when Q6 conducts, the target output voltage that needs to be output.

It may be understood that, when the voltage $V_{in}$ at the input terminal of the DC/DC converter 1 is greater than or equal to the preset voltage, the voltage management circuit 15 may increase the output voltage of the second rectifier circuit 14 by controlling the first primary-side winding 121 and the second primary-side winding 125 to be connected in series and then connected to the two voltage input terminals of the DC/DC converter 1, and controlling the working statuses of the switching transistors in the voltage management circuit 15. Therefore, the energy stored in L1 may be discharged to C1, to ensure that the output voltage of the first rectifier circuit 13 is increased to the target output voltage, that is, it is ensured that the voltage at the output terminal of the DC/DC converter 1 is the target output voltage.

In this embodiment, $V_{in}$ may be increased and decreased based on a relationship between the voltage $V_{in}$ at the input terminal of the DC/DC converter 1 and the preset voltage by controlling the connection relationship among the first primary-side winding 121, the second primary-side winding 125, and the two voltage input terminals of the DC/DC converter 1 by using the inverter circuit 11, and by changing the connection relationship among the output terminal of the first rectifier circuit 13, the output terminal of the second rectifier circuit 14, and the output terminal of the DC/DC converter 1 by using the voltage management circuit 15. This ensures that the voltage stably output by the DC/DC converter 1 is the target output voltage regardless of $V_{in}$, further expands the input voltage compatibility range of the DC/DC converter 1, and increases applicability. In addition, the DC/DC converter 1 maintains a feature of separating an isolation transformer from a voltage regulation topology in part of the power. In addition, under the boundary gain, for example, under a condition of high-voltage input/low-voltage output or low-voltage input/high-voltage output, power processed by the voltage regulation topology is less. An efficiency curve is flat in a full gain range, and applicable is high.

Figure 6:
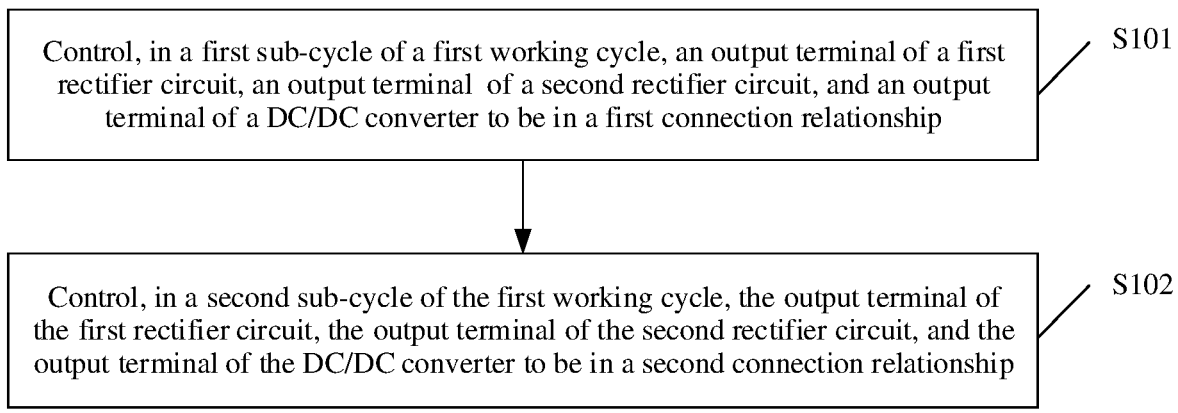
FIG. 6 is a schematic flowchart of a method for controlling an output voltage of a DC/DC converter according to this specification.

Refer to FIG. 6. FIG. 6 is a schematic flowchart of a method for controlling an output voltage of a DC/DC converter according to this specification. The method for controlling an output voltage of a DC/DC converter provided in this specification is applicable to the voltage management circuit 15 or the controller in a cascaded converter shown in FIG. 3 to FIG. 5. The method includes the following steps.

S101: Control, in a first sub-cycle of a first working cycle, an output terminal of a first rectifier circuit, an output terminal of a second rectifier circuit, and an output terminal of a DC/DC converter to be in a first connection relationship.

The first connection relationship and a second connection relationship may be any two of the following connection relationships:

the output terminal of the first rectifier circuit 13 and a branch in which the output terminal of the second rectifier circuit 14 is disposed are connected in series and then connected to the output terminal of the DC/DC converter 1;

the branch in which the output terminal of the second rectifier circuit 14 is disposed is connected to the output terminal of the DC/DC converter 1;

the output terminal of the first rectifier circuit 13 is connected to the output terminal of the DC/DC converter 1, and a first terminal of the branch in which the output terminal of the second rectifier circuit 14 is disposed is connected to the first output terminal of the DC/DC converter 1; and the branch in which the output terminal of the second rectifier circuit 14 is disposed and the output terminal of the first rectifier circuit 13 are connected in parallel to the output terminal of the DC/DC converter 1.

In an optional embodiment, when the controller is disposed inside the voltage management circuit 15, and a voltage $V_{in}$ at an input terminal of the DC/DC converter 1 is less than a preset voltage, the controller enables, by controlling working statuses of Q5 to Q7, the output terminal of the first rectifier circuit 13, the output terminal of the second rectifier circuit 14, and the output terminal of the DC/DC converter 1 to be in the first connection relationship in the first sub-cycle of the first working cycle. The first connection relationship is that the output terminal of the first rectifier circuit 13 and two output terminals of the DC/DC converter 1 are connected in series and then connected to the branch in which the output terminal of the second rectifier circuit 14 is disposed.

In another optional embodiment, when the controller is disposed inside the voltage management circuit 15, and the voltage $V_{in}$ at the input terminal of the DC/DC converter 1 is greater than or equal to the preset voltage, the controller enables, by controlling the working statuses of Q5 to Q7, the output terminal of the first rectifier circuit 13, the output terminal of the second rectifier circuit 14, and the output terminal of the DC/DC converter 1 to be in the first connection relationship in the first sub-cycle of the first working cycle. The first connection relationship is that the output terminal of the first rectifier circuit 13 is connected to the output terminal of the DC/DC converter 1, and the first terminal of the branch in which the output terminal of the second rectifier circuit 14 is disposed is connected to the first output terminal of the DC/DC converter 1.

In another optional embodiment, when the controller is disposed outside the voltage management circuit 15, and the voltage $V_{in}$ at the input terminal of the DC/DC converter 1 is less than the preset voltage, the controller sends a first control signal to the voltage management circuit 15. The voltage management circuit 15 enables, based on the received first control signal, the output terminal of the first rectifier circuit 13, the output terminal of the second rectifier circuit 14, and the output terminal of the DC/DC converter 1 to be in the first connection relationship in the first sub-cycle of the first working cycle. The first connection relationship is that the output terminal of the first rectifier circuit 13 and the branch in which the output terminal of the second rectifier circuit 14 is disposed are connected in series and then connected to the two output terminals of the DC/DC converter 1.

In still another optional embodiment, when the controller is disposed outside the voltage management circuit 15, and the voltage $V_{in}$ at the input terminal of the DC/DC converter 1 is greater than or equal to the preset voltage, the controller sends the first control signal to the voltage management circuit 15. The voltage management circuit 15 enables, based on the received first control signal, the output terminal of the first rectifier circuit 13, the output terminal of the second rectifier circuit 14, and the output terminal of the DC/DC converter 1 to be in the first connection relationship in the first sub-cycle of the first working cycle. The first connection relationship is that the output terminal of the first rectifier circuit 13 is connected to the output terminal of the DC/DC converter 1, and the first terminal of the branch in which the output terminal of the second rectifier circuit 14 is disposed is connected to the first output terminal of the DC/DC converter 1.

S102: Control, in a second sub-cycle of the first working cycle, the output terminal of the first rectifier circuit, the output terminal of the second rectifier circuit, and the output terminal of the DC/DC converter to be in the second connection relationship.

In an optional embodiment, when the controller is disposed inside the voltage management circuit 15, and the voltage $V_{in}$ at the input terminal of the DC/DC converter 1 is less than the preset voltage, the controller enables, by controlling the working statuses of Q5 to Q7, the output terminal of the first rectifier circuit 13, the output terminal of the second rectifier circuit 14, and the output terminal of the DC/DC converter 1 to be in the second connection relationship in the second sub-cycle of the first working cycle. The second connection relationship is that the branch in which the output terminal of the second rectifier circuit 14 is disposed is connected to the two output terminals of the DC/DC converter 1.

In another optional embodiment, when the controller is disposed inside the voltage management circuit 15, and the voltage $V_{in}$ at the input terminal of the DC/DC converter 1 is greater than or equal to the preset voltage, the controller enables, by controlling the working statuses of Q5 to Q7, the output terminal of the first rectifier circuit 13, the output terminal of the second rectifier circuit 14, and the output terminal of the DC/DC converter 1 to be in the second connection relationship in the second sub-cycle of the first working cycle. The second connection relationship is that the branch in which the output terminal of the second rectifier circuit 14 is disposed and the output terminal of the first rectifier circuit 13 are connected in parallel to the two output terminals of the DC/DC converter 1.

In another optional embodiment, when the controller is disposed outside the voltage management circuit 15, and the voltage $V_{in}$ at the input terminal of the DC/DC converter 1 is less than the preset voltage, the controller sends a second control signal to the voltage management circuit 15. The voltage management circuit 15 enables, based on the received second control signal, the output terminal of the first rectifier circuit 13, the output terminal of the second rectifier circuit 14, and the output terminal of the DC/DC converter 1 to be in the second connection relationship in the second sub-cycle of the first working cycle. The first connection relationship is that the branch in which the output terminal of the second rectifier circuit 14 is disposed is connected to the two output terminals of the DC/DC converter 1.

In still another optional embodiment, when the controller is disposed outside the voltage management circuit 15, and the voltage $V_{in}$ at the input terminal of the DC/DC converter 1 is greater than or equal to the preset voltage, the controller sends the second control signal to the voltage management circuit 15. The voltage management circuit 15 enables, based on the received second control signal, the output terminal of the first rectifier circuit 13, the output terminal of the second rectifier circuit 14, and the output terminal of the DC/DC converter 1 to be in the second connection relationship in the second sub-cycle of the first working cycle. The first connection relationship is that the branch in which the output terminal of the second rectifier circuit 14 is disposed and the output terminal of the first rectifier circuit 13 are connected in parallel to the two output terminals of the DC/DC converter 1.

In a specific implementation, for more operations performed by the voltage management circuit and the controller in the method for controlling an output voltage of a DC/DC converter provided in this specification, refer to implementations performed by the voltage management circuit 15 and the controller in the DC/DC converter 1 and the working principles thereof shown in FIG. 3 to FIG. 5. Details are not described herein again.

In this specification, the voltage $V_{in}$ at the input terminal of the DC/DC converter 1 may be increased or decreased by changing the connection relationship among the output terminal of the first rectifier circuit 13, the output terminal of the second rectifier circuit 14, and the output terminal of the DC/DC converter 1. This ensures that a voltage stably output by the DC/DC converter 1 is a target output voltage regardless of the voltage $V_{in}$, expands an input voltage compatibility range of the DC/DC converter, and increases applicability.

The foregoing descriptions are merely specific implementations of this specification, but are not intended to limit the protection scope of this specification. Any variation or replacement readily understood by a person skilled in the art within the technical scope disclosed in this specification shall fall within the protection scope of this specification. Therefore, the protection scope shall be defined by the claims.

What is claimed is:

1. A DC/DC converter comprising:
an inverter circuit comprising an input terminal configured to be connected to a direct current power source,
a transformer comprising a first primary-side winding, a first secondary-side winding, and a second secondary-side winding, wherein a terminal of the first primary-side winding is connected to a first output terminal of the inverter circuit, and another terminal of the first primary-side winding is connected to a second output terminal of the inverter circuit,
a first rectifier circuit comprising input terminals connected to the first secondary-side winding of the transformer,
a second rectifier circuit comprising input terminals connected to the second secondary-side winding of the transformer, and
a voltage management circuit connected to the first rectifier circuit and the second rectifier circuit,
the voltage management circuit configured to:
control, in a first sub-cycle of a first working cycle, an output terminal of the first rectifier circuit, an output terminal of the second rectifier circuit, and an output terminal of the DC/DC converter to be in a first connection relationship, and
control, in a second sub-cycle of the first working cycle, the output terminal of the first rectifier circuit, the output terminal of the second rectifier circuit, and the output terminal of the DC/DC converter to be in a second connection relationship.

2. The DC/DC converter according to claim 1, wherein the DC/DC converter further comprises a controller;
the controller is configured to send a first control signal and a second control signal to the voltage management circuit; and
the voltage management circuit is configured to: control, in the first sub-cycle based on the first control signal, the output terminal of the first rectifier circuit, the output terminal of the second rectifier circuit, and the output terminal of the DC/DC converter to be in the first connection relationship, and control, in the second sub-cycle based on the second control signal, the output terminal of the first rectifier circuit, the output terminal of the second rectifier circuit, and the output terminal of the DC/DC converter to be in the second connection relationship.

3. The DC/DC converter according to claim 1, wherein the first connection relationship and the second connection relationship are any two of the following connection relationships:
the output terminal of the first rectifier circuit and a branch in which the output terminal of the second rectifier circuit is disposed are connected in series and to the output terminal of the DC/DC converter;
the branch in which the output terminal of the second rectifier circuit is disposed is connected to the output terminal of the DC/DC converter;
the output terminal of the first rectifier circuit is connected to the output terminal of the DC/DC converter, and a first terminal of the branch in which the output terminal of the second rectifier circuit is disposed is connected to a first output terminal of the DC/DC converter; and
the branch in which the output terminal of the second rectifier circuit is disposed and the output terminal of the first rectifier circuit are connected in parallel to the output terminal of the DC/DC converter.

4. The DC/DC converter according to claim 3, wherein the first connection relationship is that the output terminal of the first rectifier circuit is connected in series to the branch in which the output terminal of the second rectifier circuit is disposed, and also connected to the output terminal of the DC/DC converter; and the second connection relationship is that the branch in which the output terminal of the second rectifier circuit is disposed is connected to the output terminal of the DC/DC converter; and
the voltage management circuit is configured to: compare a voltage at the input terminal of the DC/DC converter with a preset voltage, and based on the comparison, control the output terminal of the first rectifier circuit, the output terminal of the second rectifier circuit, and the output terminal of the DC/DC converter to be in the first connection relationship in the first sub-cycle and to be in the second connection relationship in the second sub-cycle.

5. The DC/DC converter according to claim 4, wherein a voltage at the output terminal of the DC/DC converter is $V_{out}=V_1 *D_1+V_2$, wherein $V_1$ is an output voltage of the first rectifier circuit, $V_2$ is an output voltage of the second rectifier circuit, and $D_1$ is a ratio of the first sub-cycle to the first working cycle.

6. The DC/DC converter according to claim 3, wherein the first connection relationship is that the output terminal of the first rectifier circuit is connected to the output terminal of the DC/DC converter, and the first terminal of the branch in which the output terminal of the second rectifier circuit is disposed is connected to the first output terminal of the DC/DC converter; and the second connection relationship is that the branch in which the output terminal of the second rectifier circuit is disposed and the output terminal of the first rectifier circuit are connected in parallel to the output terminal of the DC/DC converter; and
the voltage management circuit is configured to: compare the voltage at the input terminal of the DC/DC converter with a preset voltage, and based on the comparison, control the output terminal of the first rectifier circuit, the output terminal of the second rectifier circuit, and the output terminal of the DC/DC converter to be in the first connection relationship in the first sub-cycle and to be in the second connection relationship in the second sub-cycle.

7. The DC/DC converter according to claim 6, wherein a voltage at the output terminal of the DC/DC converter is $V_{out}=V_2/(1-D_1)$, wherein $V_2$ is an output voltage of the second rectifier circuit, and $D_1$ is the ratio of the first sub-cycle to the first working cycle.

8. The DC/DC converter according to claim 1, wherein the voltage management circuit comprises a first inductor, a first switching transistor, a second switching transistor, and a third switching transistor, wherein
a first terminal of the third switching transistor is connected to a first output terminal of the first rectifier circuit and a second output terminal of the DC/DC converter, a second terminal of the third switching transistor is connected to a first output terminal of the second rectifier circuit by using the first inductor, the second terminal of the third switching transistor is connected to a first terminal of the second switching transistor, a second terminal of the second switching transistor is connected to a second output terminal of the first rectifier circuit and a first terminal of the first switching transistor, and a second terminal of the first switching transistor is connected to a second output terminal of the second rectifier circuit and the first output terminal of the DC/DC converter.

9. The DC/DC converter according to claim 1, wherein the output voltage of the first rectifier circuit is $V_1=V_{in}/N11$, and the output voltage of the second rectifier circuit $V_2=V_{in}/N12$, wherein $V_{in}$ is the voltage at the input terminal of the DC/DC converter, N11 is a ratio of a number of turns of the first primary-side winding to a number of turns of the first secondary-side winding, and N12 is a ratio of the number of turns of the first primary-side winding to a number of turns of the second secondary-side winding.

10. The DC/DC converter according to claim 1, wherein the transformer further comprises a second primary-side winding, one terminal of the second primary-side winding being connected to the second output terminal of the inverter circuit, and the other terminal of the second primary-side winding being connected to a third output terminal of the inverter circuit.

11. The DC/DC converter according to claim 10, wherein the inverter circuit is configured to control the first primary-side winding and the second primary-side winding to be connected in parallel to two terminals of the direct current power source, or control the first primary-side winding and the second primary-side winding to be connected in series and then connected to the two terminals of the direct current power source.

12. The DC/DC converter according to claim 11, wherein when the DC/DC converter comprises a controller configured to send a third control signal to the inverter circuit, wherein the third control signal is used to control the inverter circuit to enable the first primary-side winding and the second primary-side winding to be connected in parallel to the two terminals of the direct current power source, or control the inverter circuit to enable the first primary-side winding and the second primary-side winding to be connected in series and to the two terminals of the direct current power source.

13. The DC/DC converter according to claim 12, wherein the controller is configured to: when the voltage at the input terminal of the DC/DC converter is less than the preset voltage, send the third control signal to the inverter circuit, wherein the third control signal is used to control the inverter circuit to enable the first primary-side winding and the second primary-side winding to be connected in parallel to the two terminals of the direct current power source.

14. The DC/DC converter according to claim 12, wherein the controller is configured to: when the voltage at the input terminal of the DC/DC converter is greater than or equal to the preset voltage, send the third control signal to the inverter circuit, wherein the third control signal is used to control the inverter circuit to enable the first primary-side winding and the second primary-side winding to be connected in series and then connected to the two terminals of the direct current power source.

15. The DC/DC converter according to claim 11, wherein when the first primary-side winding and the second primary-side winding are connected in parallel to the direct current power source, the output voltage of the first rectifier circuit is $V_1=V_{in}/N1$, and the output voltage of the second rectifier circuit is $V_2=V_{in}/N2$, wherein $V_{in}$ is the voltage at the input terminal of the DC/DC converter, N1 is a ratio of a number of turns of the first primary-side winding to a number of turns of the first secondary-side winding, and N2 is a ratio of a number of turns of the second primary-side winding to a number of turns of the second secondary-side winding.

16. The DC/DC converter according to claim 11, wherein when the first primary-side winding and the second primary-side winding are connected in series and then connected to the direct current power source, the output voltage of the first rectifier circuit is $V_1=V_{in1}/N1$, and the output voltage of the second rectifier circuit is $V_2=V_{in2}/N2$, wherein $V_{in1}$ and $V_{in2}$ are determined based on the voltage at the input terminal of the DC/DC converter, N1 is a ratio of a number of turns of the first primary-side winding to a number of turns of the first secondary-side winding, and N2 is a ratio of a number of turns of the second primary-side winding to a number of turns of the second secondary-side winding.

17. The DC/DC converter according to claim 10, wherein the DC/DC converter further comprises a first resonant circuit and a second resonant circuit, the first output terminal of the inverter circuit is connected to the one terminal of the first primary-side winding by using the first resonant circuit, the third output terminal of the inverter circuit is connected to the other terminal of the second primary-side winding by using the second resonant circuit, and a resonance parameter of the first resonant circuit is the same as that of the second resonant circuit.

18. A method for controlling an output voltage of a DC/DC converter comprising an inverter circuit, a transformer, a first rectifier circuit, and a second rectifier circuit, wherein an input terminal of the inverter circuit is used as an input terminal of the DC/DC converter and connected to a direct current power supply; the transformer comprises a first primary-side winding, a first secondary-side winding, and a second secondary-side winding, wherein one terminal of the first primary-side winding is connected to a first output terminal of the inverter circuit, the other terminal of the first primary-side winding is connected to a second output terminal of the inverter circuit, terminals of the first secondary-side winding are connected to input terminals of the first rectifier circuit, and terminals of the second secondary-side winding are connected to input terminals of the second rectifier circuit, the method comprising:
controlling, in a first sub-cycle of a first working cycle, an output terminal of the first rectifier circuit, an output terminal of the second rectifier circuit, and an output terminal of the DC/DC converter to be in a first connection relationship, and
controlling, in a second sub-cycle of the first working cycle, the output terminal of the first rectifier circuit, the output terminal of the second rectifier circuit, and the output terminal of the DC/DC converter to be in a second connection relationship.

19. The method according to claim 18, wherein the controlling, in a first sub-cycle of a first working cycle, an output terminal of the first rectifier circuit, an output terminal of the second rectifier circuit, and an output terminal of the DC/DC converter to be in a first connection relationship comprises:
controlling, in the first sub-cycle based on a first control signal, the output terminal of the first rectifier circuit, the output terminal of the second rectifier circuit, and the output terminal of the DC/DC converter to be in the first connection relationship; and
the controlling, in a second sub-cycle of the first working cycle, the output terminal of the first rectifier circuit, the output terminal of the second rectifier circuit, and the output terminal of the DC/DC converter to be in a second connection relationship comprises:
controlling, in the second sub-cycle based on a second control signal, the output terminal of the first rectifier circuit, the output terminal of the second rectifier circuit, and the output terminal of the DC/DC converter to be in the second connection relationship.

20. The method according to claim 18, wherein the first connection relationship and the second connection relationship are any two of the following connection relationships:
the output terminal of the first rectifier circuit and a branch in which the output terminal of the second rectifier circuit is disposed are connected in series and then connected to the output terminal of the DC/DC converter;
the branch in which the output terminal of the second rectifier circuit is disposed is connected to the output terminal of the DC/DC converter;
the output terminal of the first rectifier circuit is connected to the output terminal of the DC/DC converter, and a first terminal of the branch in which the output terminal of the second rectifier circuit is disposed is connected to a first output terminal of the DC/DC converter; and
the branch in which the output terminal of the second rectifier circuit is disposed and the output terminal of the first rectifier circuit are connected in parallel to the output terminal of the DC/DC converter.

* * * * *